(12) United States Patent
Fukuhara et al.

(10) Patent No.: US 12,044,940 B2
(45) Date of Patent: Jul. 23, 2024

(54) LIGHT CONTROL SHEET AND METHOD OF PRODUCING LIGHT CONTROL SHEET

(71) Applicant: TOPPAN Inc., Taito-ku (JP)

(72) Inventors: Keisuke Fukuhara, Taito-ku (JP); Atsuhiro Kato, Taito-ku (JP)

(73) Assignee: TOPPAN Inc., Taito-ku (JP)

( * ) Notice: Subject to any disclaimer, the term of this patent is extended or adjusted under 35 U.S.C. 154(b) by 0 days.

(21) Appl. No.: 18/318,175

(22) Filed: May 16, 2023

(65) Prior Publication Data

US 2023/0288761 A1    Sep. 14, 2023

Related U.S. Application Data

(63) Continuation of application No. PCT/JP2021/042264, filed on Nov. 17, 2021.

(30) Foreign Application Priority Data

Nov. 17, 2020   (JP) ................................ 2020-191233

(51) Int. Cl.
   *G02F 1/1343*   (2006.01)
   *G02F 1/1345*   (2006.01)

(52) U.S. Cl.
   CPC ........ *G02F 1/13439* (2013.01); *G02F 1/1345* (2013.01)

(58) Field of Classification Search
   None
   See application file for complete search history.

(56) References Cited

U.S. PATENT DOCUMENTS

| 2017/0152702 A1 | 6/2017 | Chang et al. |
| 2023/0280621 A1* | 9/2023 | Yamamoto ................ G02F 1/13 349/56 |
| 2023/0288760 A1* | 9/2023 | Yasuhara ............ G02F 1/13439 349/56 |

FOREIGN PATENT DOCUMENTS

| CN | 110554529 A | 12/2019 |
| CN | 210666261 U * | 6/2020 |

(Continued)

OTHER PUBLICATIONS

International Search Report issued Feb. 1, 2022 in International Application No. PCT/JP2021/042264 filed Nov. 17, 2021, 6 pages (with English Translation).

(Continued)

*Primary Examiner* — Ryan Crockett
(74) *Attorney, Agent, or Firm* — Oblon, McClelland, Maier & Neustadt, L.L.P.

(57) ABSTRACT

A light control sheet includes electrode layers including first transparent electrode layer and a second transparent electrode layer, a light control layer formed between the first and second transparent electrode layers, and transparent support layers including a first transparent support layer and a second transparent support layer such that the first transparent support layer is formed on the first transparent electrode layer on the opposite side of the light control layer and has a support surface supporting the first transparent electrode layer and that the second transparent support layer is formed the second transparent electrode layer on the opposite side of the light control layer. The first transparent electrode layer has one or more grooves extending along the support surface such that the first transparent electrode layer has an electrode element having a narrow portion formed between portions of the groove and having a width of 1 mm or more.

20 Claims, 13 Drawing Sheets

(56) References Cited

FOREIGN PATENT DOCUMENTS

| | | | |
|---|---|---|---|
| JP | 2018-045135 A | | 3/2018 |
| JP | 2019105680 A | * | 6/2019 |
| KR | 20190023522 A | * | 3/2019 |

OTHER PUBLICATIONS

Extended European Search Report issued Apr. 30, 2024 in European Application No. 21894694.5, filed Nov. 17, 2021, 10 pages.

* cited by examiner

| | EXAMPLE 1 | EXAMPLE 2 | EXAMPLE 3 | EXAMPLE 4 | EXAMPLE 5 | EXAMPLE 6 | COMPARATIVE EXAMPLE 1 |
|---|---|---|---|---|---|---|---|
| WIDTH OF CONDUCTIVE PORTION (mm) | 50 | 30 | 10 | 5 | 2 | 1 | 0.5 |
| RESISTANCE VALUE (Ω) | 494 | 719 | 1,225 | 2,259 | 5,220 | 10,900 | 26,800 |

| | EXAMPLE 7 | EXAMPLE 8 | EXAMPLE 9 | EXAMPLE 10 | EXAMPLE 11 | EXAMPLE 12 | COMPARATIVE EXAMPLE 2 |
|---|---|---|---|---|---|---|---|
| WIDTH OF CONDUCTIVE PORTION (mm) | 50 | 30 | 10 | 5 | 2 | 1 | 0.5 |
| EFFECTIVE VOLTAGE (V) | 81.4 | 81.4 | 81.2 | 80.9 | 79.8 | 79.9 | 7.9 |
| REPEATED DRIVING | ○ | ○ | ○ | ○ | ○ | ○ | × |

LIGHT CONTROL SHEET AND METHOD OF PRODUCING LIGHT CONTROL SHEET

CROSS-REFERENCE TO RELATED APPLICATIONS

The present application is a continuation of International Application No. PCT/JP2021/042264, filed Nov. 17, 2021, which is based upon and claims the benefits of priority to Japanese Application No. 2020-191233, filed Nov. 17, 2020. The entire contents of all of the above applications are incorporated herein by reference.

BACKGROUND OF THE INVENTION

Field of the Invention

The present disclosure relates to a light control sheet having a variable light transmittance, and a method of producing the light control sheet.

Description of Background Art

A light control sheet includes a light control layer containing a liquid crystal composition, and a pair of transparent electrode layers sandwiching the light control layer. A drive voltage is applied between the pair of transparent electrode layers. The alignment of liquid crystal molecules of the liquid crystal composition is changed according to a potential difference between the transparent electrode layers, leading to a change in light transmittance of the light control sheet. For example, when the major axes of the liquid crystal molecules are aligned in the thickness direction of the light control layer, the light control sheet is colorless and transparent, and has a high light transmittance. When the major axes of the liquid crystal molecules intersect the thickness direction of the light control layer, light is scattered in the light control layer, and the light control sheet has a low light transmittance (see, for example, JP 2018-45135A). The entire contents of this publication are incorporated herein by reference.

SUMMARY OF THE INVENTION

According to one aspect of the present invention, a light control sheet includes electrode layers including first transparent electrode layer and a second transparent electrode layer, a light control layer formed between the first transparent electrode layer and the second transparent electrode layer, and transparent support layers including a first transparent support layer and a second transparent support layer such that the first transparent support layer is formed on the first transparent electrode layer on the opposite side with respect to the light control layer and has a support surface supporting the first transparent electrode layer and that the second transparent support layer is formed the second transparent electrode layer on the opposite side with respect to the light control layer. The first transparent electrode layer has one or more grooves extending along the support surface such that the first transparent electrode layer has an electrode element having a narrow portion formed between portions of the groove and having a width of 1 mm or more.

According to another aspect of the present invention, a method of producing a light control sheet includes forming one or more grooves in a first film including a first transparent support layer and a first transparent electrode layer supported by the first transparent support layer such that the groove passes through at least the first transparent electrode layer and forms an electrode element in the first transparent electrode layer, and forming a light control layer between the first film and a second film including a second transparent support layer and a second transparent electrode layer supported by the second transparent support layer. The groove is formed such that the electrode element has a narrow portion formed between portions of the groove and having a width of 1 mm or more.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
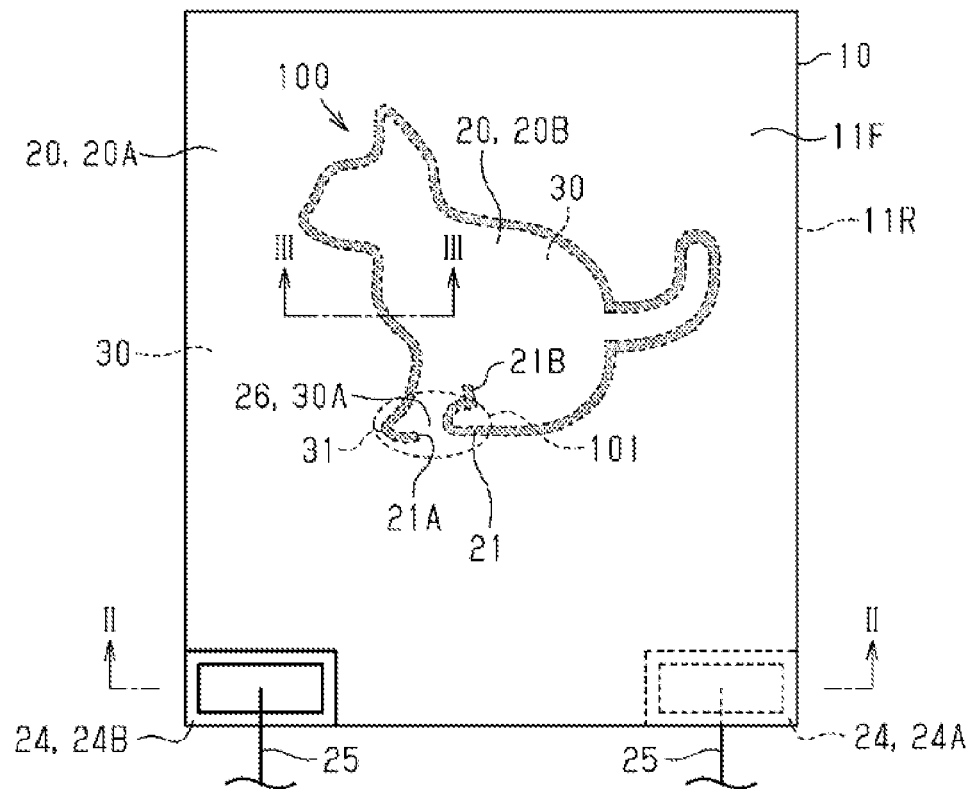
FIG. 1 is a front view of a normal-type light control sheet according to a first embodiment of the present invention.

Embodiments will now be described with reference to the accompanying drawings, wherein like reference numerals designate corresponding or identical elements throughout the various drawings.

First Embodiment

Embodiments of a light control sheet and a method of producing the light control sheet will be described with reference to FIGS. 1 to 7. A light control sheet 10 according to an embodiment of the present invention is a normal-type light control sheet in which when no voltage signal is applied to the light control sheet 10, incident light in a region to be driven is scattered to reduce the translucency of the light control sheet 10 and when a voltage signal is applied to the light control sheet 10, the translucency of the light control sheet 10 is increased.

Light Control Sheet

A planar structure of the light control sheet 10 will be described with reference to FIG. 1. As shown in FIG. 1, the light control sheet 10 has a first surface 11F, and a second surface 11R opposite to the first surface 11F. The light control sheet 10 has a drive region 20 and a non-driven region 21.

The light control sheet 10 has a laminated structure. The drive region 20 is a region including, as a part of the laminated structure, a drive electrode element 30 which is an electrode element to which a voltage signal is applied when the light control sheet 10 is driven. The light transmittance of the drive region 20 is changed according to the application state of a voltage signal to the drive electrode element 30. The drive electrode element 30 is an example of a first electrode element. The non-driven region 21 is a region including, as a part of the laminated structure, a floating electrode element 31 which is an electrode element to which no voltage signal is applied when the light control sheet 10 is driven. The floating electrode element 31 is an example of a second electrode element. The light transmittance of the drive region 20 changes according to the application state of a voltage signal to the drive region 20, while the light transmittance of the non-driven region 21 does not change according to the application state of a voltage signal to the non-driven region 21. In FIG. 1, the non-driven region 21 is provided along a design. The design is, for example, a character, a number, a symbol, a figure, a pattern, a patterned design, or the like, or a combination thereof.

The non-driven region 21 shown in FIG. 1 has a long narrow linear shape and is curved at multiple portions between one end portion 21A and the other end portion 21B. The drive region is divided into a drive region 20B having a predetermined design shape and a drive region 20A located outside the drive region 20B, that are defined by the non-driven region 21. Portions of the non-driven region 21 do not contact or intersect with each other between the end portion 21A and the end portion 21B, and are separated from each other by a predetermined distance or more. In FIG. 1, a distance is maintained between portions of the non-driven region 21 also in a region 101 in which portions of the non-driven region 21 are located close to each other. The drive regions 20A and 20B defined by the non-driven region 21 are electrically connected to each other via a narrow portion 30A that is located between portions of a groove 120, that is, located between a first portion and a second portion of the groove 120. In other words, the drive electrode element has a conductive portion 26 that is located between portions of the non-driven region 21 including the groove 120 and the floating electrode element 31. The narrow portion 30A has a smaller width than the drive regions 20A and 20B, and connects the drive regions 20A and 20B. The drive region 20B is surrounded by the non-driven region 21 and the narrow portion 30A. The drive region 20A corresponds to an outer region, and the drive region 20B corresponds to an inner region.

A connection region 24 is a region for applying a voltage signal to the drive region 20, and external wiring 25 is connected to the connection region 24. The connection region 24 and the drive region 20 are adjacent to each other. The position in the light control sheet 10 at which the connection region 24 is provided is not particularly limited. The connection region 24 is located, for example, in a corner portion of the light control sheet 10.

When a voltage signal is applied to the driving region 20 via the connection region 24, the driving regions 20A and 20B have a high light transmittance. On the other hand, the light transmittance of the non-driven region 21 does not change. Thus, a design 100 formed of the non-driven region 21 having a linear shape appears in the light control sheet 10. At this time, the drive region 20B surrounded by the non-driven region 21 has a high light transmittance; thus, the design 100 that is "hollow" is displayed. FIG. 1 shows the light control sheet 10 that displays a single design using the non-driven region 21; however, the light control sheet 10 may display multiple designs. That is, the light control sheet 10 may include multiple independent non-driven regions 21 that are not connected to each other.

Figure 2:
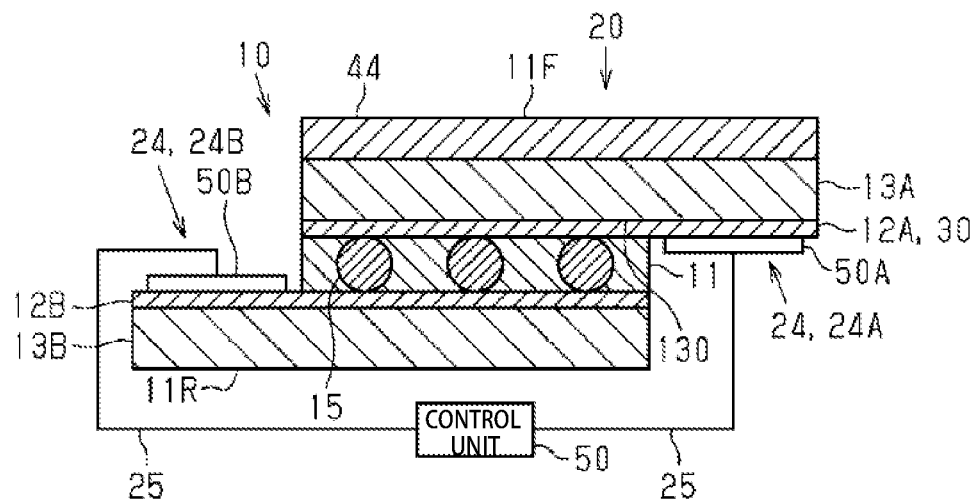
FIG. 2 is a cross-sectional view of the light control sheet according to the first embodiment of the present invention.

The laminated structure of the light control sheet 10 will be described with reference to FIGS. 2 and 3. FIG. 2 is a cross-sectional view taken along line II-II in FIG. 1. FIG. 2 shows a cross section of the light control sheet 10 in the drive region 20 and the connection region 24. The thickness ratio of the layers in FIG. 2 is shown for convenience of description, and the thickness ratio of the layers is not limited to the thickness ratio shown in FIG. 2.

The light control sheet 10 includes a light control layer 11, a first transparent electrode layer 12A, a second transparent electrode layer 12B, a first transparent support layer 13A, and a second transparent support layer 13B. The light control layer 11 is sandwiched between the first transparent electrode layer 12A and the second transparent electrode layer 12B. The first transparent support layer 13A supports, by a support surface 130 which is a single continuous surface, a surface of the first transparent electrode layer 12A facing away from the light control layer 11. The second transparent support layer 13B supports a surface of the second transparent electrode layer 12B facing away from the light control layer 11. The light control layer 11 may have a single-layer structure or a multilayer structure. A light control layer 11 having a multilayer structure may include a functional layer having a light control function, a thin layer for improving adhesion between the functional layer and the first transparent electrode layer 12A, and a thin layer for improving adhesion between the functional layer and the second transparent electrode layer 12B.

The light control sheet 10 further includes a protective layer 44. The protective layer 44 is located on the side of the first transparent support layer 13A facing away from the first transparent electrode layer 12A. The protective layer 44 may be fixed to the first transparent support layer 13A via an adhesive layer (not shown).

The first surface 11F of the light control sheet 10 is a surface of the protective layer 44 opposite to a surface of the protective layer 44 facing the first transparent support layer 13A. The second surface 11R of the light control sheet 10 is a surface of the second transparent support layer 13B opposite to a surface of the second transparent support layer 13B facing the second transparent electrode layer 12B. The second surface 11R is adhered to a transparent plate made of glass, resin, or the like via an adhesive layer (not shown). The transparent plate is, for example, a window glass of various buildings such as houses, stores, stations, and airports, a partition in offices, a display window in stores, or a window glass or a windshield of moving objects such as vehicles and aircraft. The transparent plate may have a flat surface or a curved surface.

The connection region 24 includes a first connection region 24A that is connected to external wiring 25 for applying a voltage signal to the first transparent electrode layer 12A, and a second connection region 24B that is connected to external wiring 25 for applying a voltage signal to the second transparent electrode layer 12B.

The first connection region 24A is a region that does not include the light control layer 11, the second transparent electrode layer 12B, or the second transparent support layer 13B and in which the first transparent electrode layer 12A is exposed. A first terminal portion 50A is connected to the first transparent electrode layer 12A exposed in the first connection region 24A. That is, the drive electrode element 30 extends from the drive region 20 to the first connection region 24A, and the first terminal portion 50A is connected to the drive electrode element 30 in the first connection region 24A.

The second connection region 24B is a region that does not include the light control layer 11, the first transparent electrode layer 12A, the first transparent support layer 13A, or the protective layer 44 and in which the second transparent electrode layer 12B is exposed. A second terminal portion 50B is connected to the second transparent electrode layer 12B exposed in the second connection region 24B.

One of the external wirings 25 extends from the first terminal portion 50A and the other external wiring 25 extends from the second terminal portion 50B, and the external wirings 25 are connected to a control unit 50. The control unit 50 applies a voltage signal to the drive electrode element 30 of the first transparent electrode layer 12A through the first terminal portion 50A, and applies a voltage signal to the second transparent electrode layer 12B through the second terminal portion 50B. Thus, the control unit 50 controls a potential difference between the first transparent electrode layer 12A and the second transparent electrode layer 12B in the drive region 20. The second transparent electrode layer 12B is controlled to have, for example, a ground potential. The light control sheet 10 and the control unit 50 constitute a light control device.

The light control layer 11 includes a transparent polymer layer and a liquid crystal composition. The transparent polymer layer has voids containing the liquid crystal composition. The liquid crystal composition is contained in the voids of the transparent polymer layer. The liquid crystal composition contains liquid crystal molecules. The liquid crystal composition may be made of a known material. The liquid crystal molecules are, for example, selected from those based on Schiff bases, azo types, azoxy types, biphenyls, terphenyls, benzoic acid esters, tolans, pyrimidines, cyclohexanecarboxylic acid esters, phenylcyclohexanes, and dioxanes. The light control layer 11 having a single-layer structure is composed of only a functional layer including a transparent polymer layer and a liquid crystal composition.

The liquid crystal composition is held in one of a polymer network type, a polymer dispersion type, and a capsule type. The polymer network type has a three-dimensional mesh transparent polymer network. Voids of the mesh communicate with each other, and a liquid crystal composition is held in the voids of the mesh. The polymer network is an example of a transparent polymer layer. The polymer dispersion type has a large number of isolated voids in a transparent polymer layer, and holds a liquid crystal composition in the voids dispersed in the polymer layer. The capsule type holds an encapsulated liquid crystal composition in a transparent polymer layer. The liquid crystal composition may contain a monomer for forming a transparent polymer layer, dichroic dye, and the like, in addition to the liquid crystal molecules described above. The light control layer 11 may include spacers 15 for maintaining the thickness of the light control layer 11 in a fixed range.

The first transparent electrode layer 12A and the second transparent electrode layer 12B are each conductive and transparent to light in the visible region. The first transparent electrode layer 12A and the second transparent electrode layer 12B may be made of a known material. Examples of the material for forming the first transparent electrode layer 12A and the second transparent electrode layer 12B include indium tin oxide, fluorine-doped tin oxide, tin oxide, zinc oxide, carbon nanotubes, and poly(3,4-ethylenedioxythiophene).

The first transparent support layer 13A and the second transparent support layer 13B are each a substrate transparent to light in the visible region. The first transparent support layer 13A and the second transparent support layer 13B may be made of a known material. The material for forming the first transparent support layer 13A and the second transparent support layer 13B may be, for example, a synthetic resin or an inorganic compound. Examples of the synthetic resin include polyester, polyacrylate, polycarbonate, and polyolefin. Examples of the polyester include polyethylene terephthalate and polyethylene naphthalate. The polyacrylate may be, for example, polymethyl methacrylate or the like. Examples of the inorganic compound include silicon dioxide, silicon oxynitride, and silicon nitride.

The first terminal portion 50A and the second terminal portion 50B each include, for example, a conductive adhesive layer and a circuit board. The conductive adhesive layer is composed of, for example, an anisotropic conductive film (ACF), an anisotropic conductive paste (ACP), an isotropic conductive film (ICF), an isotropic conductive paste (ICP), or the like. The circuit board may be, for example, a flexible printed circuit (FPC).

Alternatively, the first terminal portion 50A and the second terminal portion 50B each may have a structure in which a conductive material such as a conductive tape and the external wirings 25 are joined by soldering or the like.

In the drive region 20, a change in the voltage generated between the first transparent electrode layer 12A and the second transparent electrode layer 12B causes a change in the alignment of the liquid crystal molecules in the light control layer 11. The change in the alignment of the liquid crystal molecules leads to a change in the degree of scattering, degree of absorption, and degree of transmission of visible light incident on the light control layer 11. Specifically, when no voltage signal is applied to the first transparent electrode layer 12A or the second transparent electrode layer 12B in the drive region 20, the major axes of the liquid crystal molecules are oriented in random directions. This leads to a high degree of scattering of light incident on the light control layer 11, causing the drive region 20 to appear turbid. That is, the drive region 20 is opaque when no voltage signal is applied to the light control layer 11. On the other hand, when a voltage signal is applied to the first transparent electrode layer 12A and the second transparent electrode layer 12B, and a potential difference with a predetermined value or more occurs between the first transparent electrode layer 12A and the second transparent electrode layer 12B, the liquid crystal molecules are aligned, and the major axes of the liquid crystal molecules are aligned in the direction of an electric field between the first transparent electrode layer 12A and the second transparent electrode layer 12B. Thus, light can more easily be transmitted through the light control layer 11, and the drive region 20 is transparent.

Figure 3:
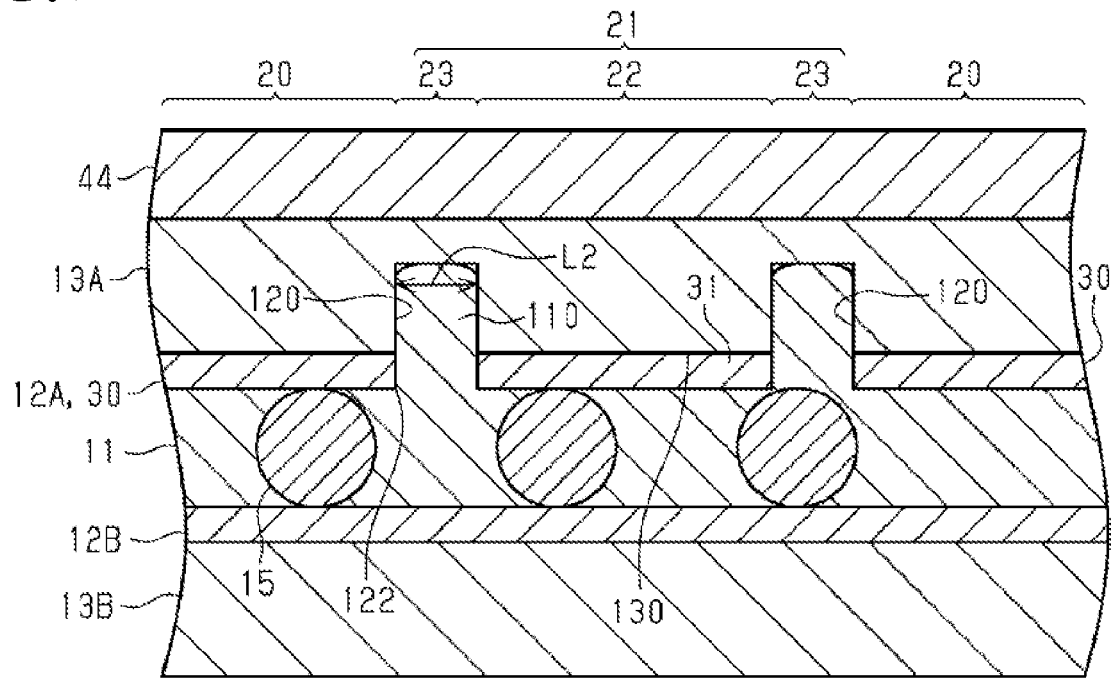
FIG. 3 is a cross-sectional view of the light control sheet according to the first embodiment of the present invention.

FIG. 3 is a cross-sectional view taken along line III-III in FIG. 1 and includes the non-driven region 21. As shown in FIG. 3, in the first transparent electrode layer 12A, the drive electrode element 30 is located in the drive region 20. The non-driven region 21 includes a floating region 22 in which the floating electrode element 31 is located, and a boundary region 23 in which the groove 120 is located. The boundary region 23 includes no electrode element. That is, the floating region 22 is defined by the boundary region 23 composed of the groove 120. The drive electrode element 30 and the floating electrode element 31 are layer members formed separately along the support surface 130 of the first transparent support layer 13A.

The drive electrode element 30 and the floating electrode element 31 are separated from each other by the groove 120. In the present embodiment, the groove 120 has an opening 122 in a portion of the first transparent electrode layer 12A facing the light control layer 11, and passes through the first transparent electrode layer 12A and extends to an intermediate portion of the first transparent support layer 13A in the thickness direction. By the groove 120 separating the drive electrode element 30 and the floating electrode element 31 from each other, the drive electrode element 30 and the floating electrode element 31 are insulated from each other.

The groove 120 may have a width L2 smaller than a diameter of the spacers 15. This prevents the spacers 15 from entering the groove 120. The groove 120 contains a liquid crystal composition. The liquid crystal composition may be contained in a part of the groove 120, and does not have to be contained in the entire portion of the groove 120. The groove 120 containing the liquid crystal composition is less conspicuous when the light control sheet 10 is visually recognized from the first surface 11F or the second surface 11R.

Figure 4:
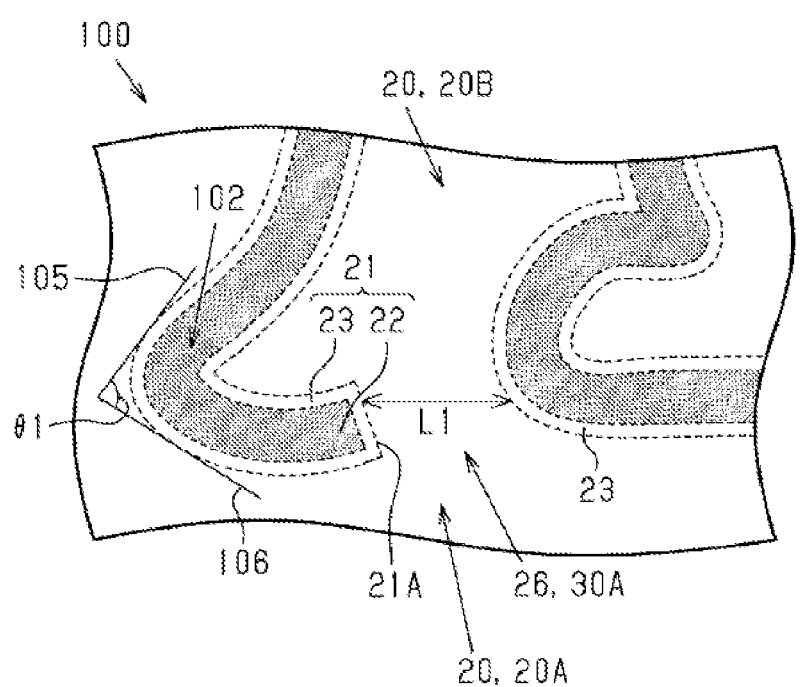
FIG. 4 is an enlarged view of a major part of the light control sheet according to the first embodiment of the present invention.

The non-driven region 21 will be described with reference to FIGS. 4 and 5. FIG. 4 is an enlarged view of the region 101 in FIG. 1. The drive regions 20A and 20B are connected by the narrow portion 30A provided between portions of the non-driven region 21. The narrow portion 30A may be provided to connect a first portion and a second portion of the non-driven region 21 as shown in FIG. 4. Alternatively, the narrow portion 30A may be provided between the end portion 21A and the end portion 21B. The narrow portion 30A has a width L1 of 1 mm or more to ensure conductivity between the drive region 20A located outside the non-driven region 21 and the drive region 20B located inside the non-driven region 21. That is, a relative distance of 1 mm or more is provided between different portions between the end portion 21A and the end portion 21B of the non-driven region 21 including the single groove 120 and the floating electrode element 31 which is the second electrode element. If the width L1 of the narrow portion 30A is less than 1 mm, the narrow portion 30A has a high resistance value; thus, the drive regions 20A and 20B may not have the same light transmittance, preventing the drive region 20B from being changed from the opaque state to the transparent state when a drive voltage is applied. In the light control sheet that displays a hollow design as shown in FIG. 1, the width L1 of the narrow portion 30A may be 30 mm or less to allow the light control sheet 10 to have improved designability. If the width L1 of the narrow portion 30A exceeds 30 mm, the desired shape may not be achieved.

The non-driven region 21 has a curved portion 102 that is curved or bent according to the design. When the curved portion 102 of the non-driven region 21 is curved as shown in FIG. 4, the minimum value of an angle $\theta 1$ formed by tangent lines 105 and 106 that are in contact with different portions of the curved portion 102 is 10 degrees or more.

Figure 5:
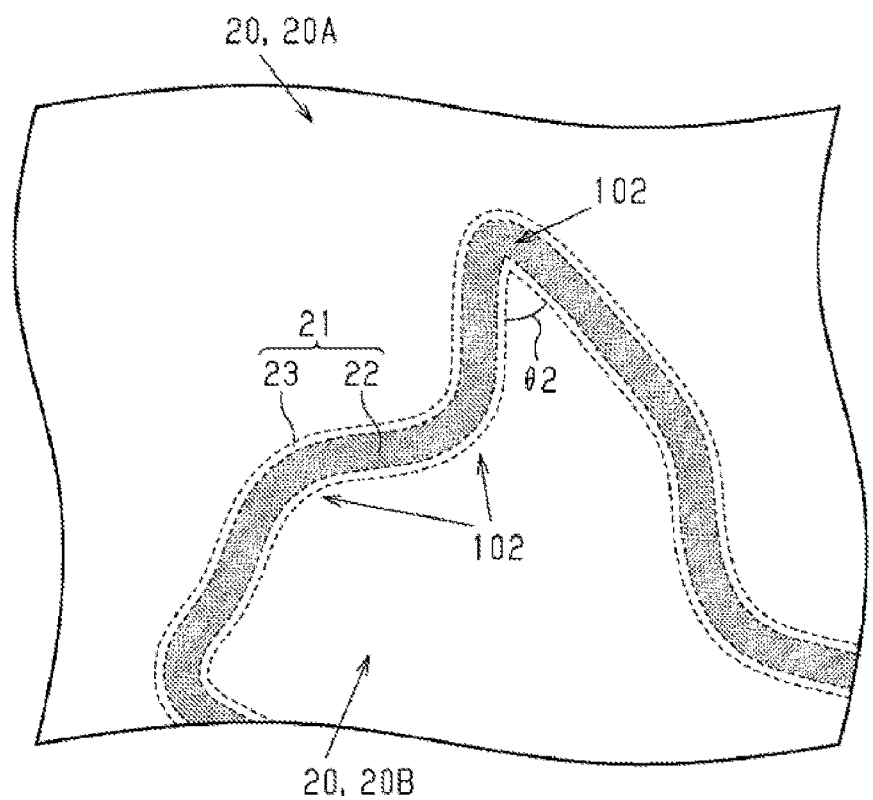
FIG. 5 is an enlarged view of a major part of the light control sheet according to the first embodiment of the present invention.

When the curved portion 102 is composed of two linear portions of the non-driven region 21 that extend in different directions to each other as shown in FIG. 5, the minimum value of an angle $\theta 2$ formed by the portions of the non-driven region 21 is 10 degrees or more. If the angles $\theta 1$ and $\theta 2$ are less than 10 degrees, the first transparent support layer 13A and the first transparent electrode layer 12A may be peeled off in the step of forming the groove 120 or after formation of the groove 120. When the angles $\theta 1$ and $\theta 2$ are 10 degrees or more, it is possible to prevent the first transparent support layer 13A and the first transparent electrode layer 12A from being peeled off, enabling the design formed of the non-driven region 21 to be clear.

Method of Producing Light Control Sheet

Figure 6:
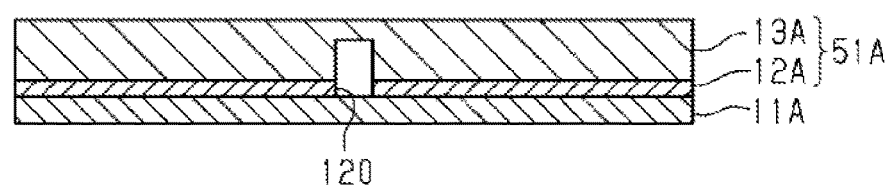
FIG. 6 is a schematic diagram showing a method of producing the light control sheet according to the first embodiment of the present invention.
Figure 6:
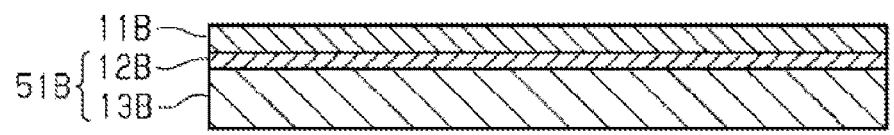

An example of a method of producing the light control sheet 10 will be described with reference to FIG. 6.

First, a film 51A including the first transparent electrode layer 12A and the first transparent support layer 13A and a film 51B including the second transparent electrode layer 12B and the second transparent support layer 13B are prepared. Of these, the groove 120 is formed on the film 51A including the first transparent electrode layer 12A and the first transparent support layer 13A using a cutting plotter from the side where the first transparent electrode layer 12A is located. A control device connected to the cutting plotter causes the cutting plotter to form the groove 120 along a design input in advance.

A device other than the cutting plotter may be used to form the groove 120. For example, a laser cutting device may be used to form the groove 120 in the first transparent electrode layer 12A. The laser cutting device may be, for example, a laser including a $CO_2$ laser. When a laser cutting device is used, a portion of the film that is irradiated with a laser beam is directly destroyed to form the groove 120.

Then, a liquid material including the spacers 15, containing divinylbenzene or the like as a main material and a dispersion medium for dispersing the spacers 15, is applied to a surface of the film 51A on the side where the first transparent electrode layer 12A is located and to a surface of the film 51B on the side where the second transparent electrode layer 12B is located. Furthermore, the films on which the spacers 15 are scattered are heated to remove the dispersion medium. At this time, the spacers 15 may be scattered on only one of the films.

A light control material containing a transparent polymer material and a liquid crystal composition is applied to the first transparent electrode layer 12A of the film 51A having the groove 120 and the second transparent electrode layer 12B of the film 51B having no groove 120. Furthermore, the films 51A and 51B are irradiated with ultraviolet light under a nitrogen atmosphere to form light control layers 11A and 11B, respectively. The pair of films obtained in this manner are laminated and attached together under a predetermined amount of pressure. Thus, the groove 120 contains the light control material.

The light control sheet 10 may be formed either by a roll-to-roll method in which a film transferred from a roll on the upstream side is subjected to various steps and the film is wound around a roll on the downstream side or by a single-sheet production process in which a film cut into a predetermined size is subjected to various steps. In either of the cases, the step of forming the groove 120 is performed before the film composed of the first transparent electrode layer 12A and the first transparent support layer 13A and the film composed of the second transparent electrode layer 12B and the second transparent support layer 13B are attached together via the light control layer 11.

Then, a slit is made in a corner portion of the second surface 11R of the light control sheet having a predetermined size, and the second transparent support layer 13B and the second transparent electrode layer 12B in the corner portion are removed. Furthermore, the light control layer 11 in the corner portion is removed to expose the first transparent electrode layer 12A, and the connection region 24 is formed. Similarly, the connection region 24 is formed in a corner portion of the first surface 11F. Then, the first terminal portion 50A and the second terminal portion 50B are formed, and the external wiring 25 is connected to the connection region 24. Furthermore, the connection region 24 is sealed with an epoxy resin or the like. The step of attaching the protective layer 44 to the first transparent support layer 13A may be performed after the pair of films are attached together.

Thus, making a slit in the first transparent electrode layer 12A and the first transparent support layer 13A to form the groove 120 enables simpler formation of the groove 120 compared with, for example, a production method including steps such as formation of a resist mask required for patterning, exposure, development, etching, removal of the resist mask, and washing.

Figure 7:
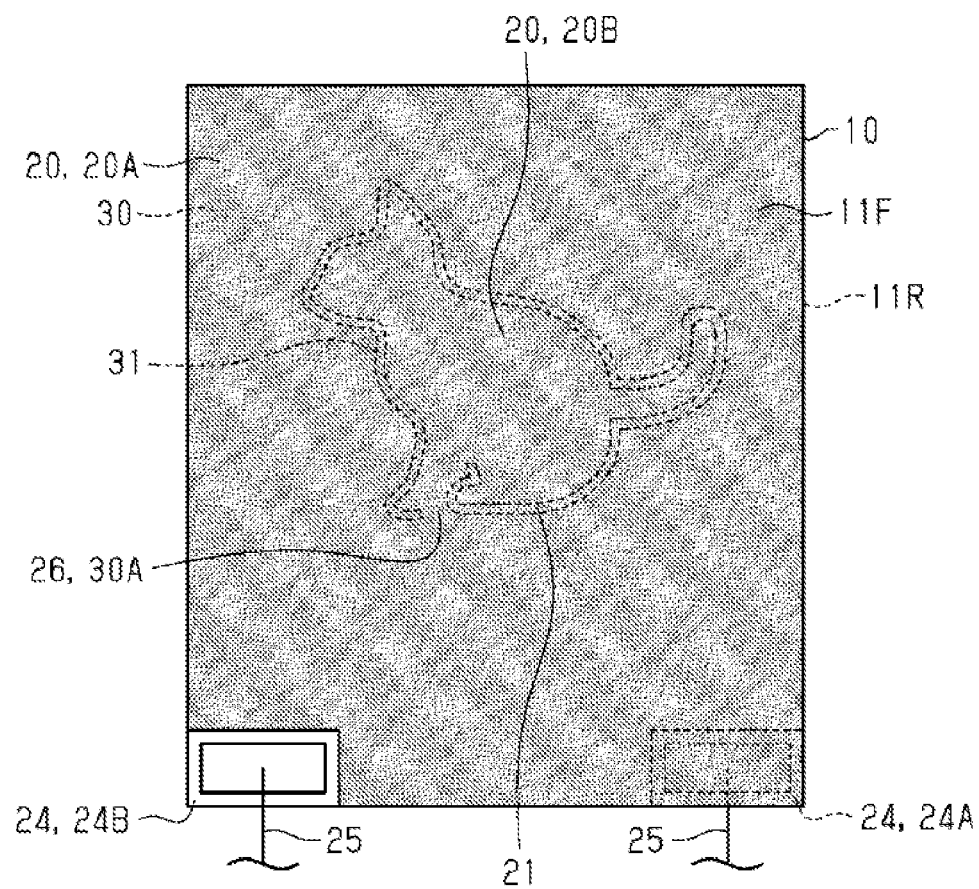
FIG. 7 is a front view of the light control sheet according to the first embodiment of the present invention when the light control sheet is not driven.

Effects of the present embodiment will be described with reference to FIGS. 1 and 7. FIG. 7 schematically shows the degree of transparency of the light control sheet 10 when the light control sheet 10 is not driven, that is, when no voltage signal is applied to the first transparent electrode layer 12A or the second transparent electrode layer 12B. When the light control sheet 10 is not driven, the drive region 20 and the non-driven region 21 are both opaque. Therefore, the entire surface of the light control sheet 10 appears, for example, whitish and turbid, and an image of a character, pattern, or the like composed of the non-driven region 21 is not visually recognized.

The groove 120 has a depth that allows the groove 120 to pass through the first transparent electrode layer 12A but not to pass through the first transparent support layer 13A; thus, the groove 120 is not conspicuous when viewed from either the first surface 11F or the second surface 11R of the light control sheet 10. In addition, when the groove 120 contains the light control material, the groove 120 is even less likely to be visually recognized. This allows the light control sheet 10 to have a better aesthetic appearance when the design is displayed.

As shown in FIG. 1, when the light control sheet 10 is driven, the drive region 20 is transparent and the non-driven region 21 is opaque. Therefore, only the non-driven region 21 appears, for example, whitish and turbid, and an image of the design such as a character or pattern composed of the non-driven region 21 can be visually recognized. At this time, due to the application of a voltage signal, the drive region 20B surrounded by the non-driven region 21 and the drive region 20A located outside the drive region 20B are transparent.

Thus, in the light control sheet 10 of the present embodiment, the surface of the light control sheet 10 has the regions different in light transmittance from each other, and the difference in light transmittance between the regions appears only when the light control sheet 10 is driven. Therefore, when the light control sheet 10 is driven, an image of a character, pattern, or the like composed of the non-driven region 21 is visually recognized, enabling decoration of a space in which the light control sheet 10 is provided. Furthermore, by switching the light control sheet 10 between the driven state and the non-driven state, the light control sheet 10 can be switched between the state in which the image is displayed and the state in which the image is not displayed, enabling a dynamic change in the decoration state of the space. This allows the light control sheet to have improved designability.

As described above, the first embodiment provides the advantages listed below.

(1) By applying a voltage signal to only one of the drive electrode element 30 and the floating electrode element 31 or by applying different voltage signals to the drive electrode element and the floating electrode element 31, it is possible to cause the drive region 20 of the light control sheet 10 in which the drive electrode element 30 is located and the non-driven region 21 of the light control sheet 10 in which the floating electrode element 31 is located to be different in light transmittance. Thus, by changing the application state of a voltage signal to these regions, it is possible to cause the design to appear in the light control sheet 10, allowing the light control sheet 10 to have improved designability. Furthermore, the narrow portion 30A of the drive electrode element 30 has a width of 1 mm or more; thus, for example, the first transparent electrode layer 12A and the first transparent support layer 13A are less likely to be separated in the step of forming the groove 120 or after formation of the groove 120. Even when different portions of the single groove 120 or different grooves 120 are located close to each other in a region, a relative distance of 1 mm or more is always maintained between the different portions of the groove 120 or the different grooves 120; thus, conductivity can be ensured in the single electrode element in the region. This makes it possible to prevent a conduction failure caused by an increase in resistance in the region, enabling appropriate control of the light transmittance of the drive electrode element 30 and the floating electrode element 31. This enables the light control sheet 10 to clearly display the design, which increases the designability of the light control sheet 10.

(2) The narrow portion 30A electrically connects the drive region 20A which is the outer region to the drive region 20B which is the inner region surrounded by the floating electrode element 31 and the groove 120; thus, the change in light transmittance can be synchronized between the drive regions 20A and 20B according to the application state of a voltage signal to the drive electrode element 30. This enables the light control sheet 10 to display, for example, a hollow design, the inside of which is high in transparency.

(3) The angle of the curved portion 102 of the non-driven region 21 or the angle formed by the tangent lines 105 and 106 of the curved portion 102 is 10 degrees or more; thus, for example, the first transparent electrode layer 12A and the first transparent support layer 13A are less likely to be peeled off in the step of forming the groove 120, making it possible to easily form the drive electrode element 30 and the floating electrode element 31 having a desired shape. This enables the light control sheet 10 to clearly display the design.

(4) The groove 120 that defines the drive region 20 and the non-driven region 21 has a depth that allows the groove 120 to pass through the first transparent electrode layer 12A but not to pass through the first transparent support layer 13A; thus, the scattering of light by the groove 120 is prevented on a surface of the first transparent support layer 13A facing away from the support surface. This enables the groove 120 to be less conspicuous at least when the light control sheet 10 is viewed from a position perpendicular to the surface of the first transparent support layer 13A opposite to the support surface and from the side where the first transparent electrode layer 12A is located. This allows the light control sheet 10 to have a better aesthetic appearance.

Second Embodiment

Next, a second embodiment of the light control sheet 10 will be described with reference to FIG. 8. The second embodiment is different from the first embodiment in the laminated structure of the light control sheet 10. In the following description, the same portions as in the first embodiment are denoted by the same reference numerals and are not described in detail.

Figure 8:
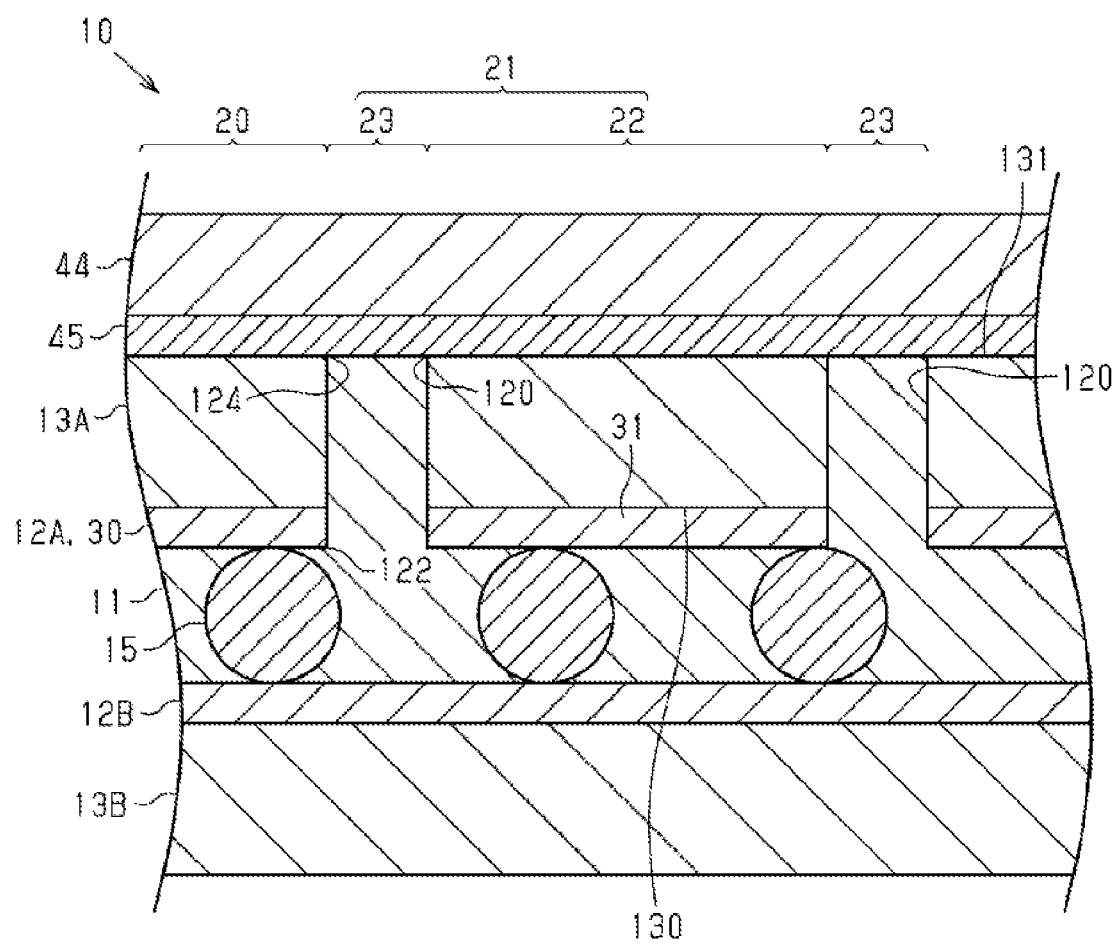
FIG. 8 is a cross-sectional view of a light control sheet according to a second embodiment of the present invention.

FIG. 8 shows a cross section of the light control sheet 10. The drive electrode element 30 and the floating electrode element 31 are separated from each other by the groove 120. The groove 120 extends in the thickness direction of the first transparent electrode layer 12A. In the present embodiment, the groove 120 extends in the thickness direction of the first transparent electrode layer 12A and the first transparent support layer 13A, and passes through the first transparent electrode layer 12A and the first transparent support layer 13A. The groove 120 has the opening 122 located in a portion of the first transparent electrode layer 12A facing the light control layer 11, and an opening 124 located in a portion of the first transparent support layer 13A facing away from the first transparent electrode layer 12A. By the groove 120 separating the drive electrode element 30 and the floating electrode element 31 from each other, the drive electrode element 30 and the floating electrode element 31 are insulated from each other.

The opening 124 of the groove 120 is sealed by the protective layer 44 via an adhesive layer 45. The adhesive layer 45 may be made of a translucent material capable of joining together the protective layer 44 and the first transparent support layer 13A. For example, the adhesive layer is a transparent adhesive film (optical clear adhesive film), and joins the first transparent support layer 13A and the protective layer 44.

Method of Producing Light Control Sheet

An example of a method of producing the light control sheet 10 will be described.

As in the first embodiment, the film 51A including the first transparent electrode layer 12A and the first transparent support layer 13A and the film 51B including the second transparent electrode layer 12B and the second transparent support layer 13B are prepared. Furthermore, the spacers 15 are scattered on the films 51A and 51B, and a light control material containing a transparent polymer material and a liquid crystal composition are applied to the films 51A and 51B. The light control layers 11A and 11B are formed, and the pair of films 51A and 51B are laminated and attached together under a predetermined amount of pressure.

In the laminate formed in this manner, a slit is made from a surface 131 of the first transparent support layer 13A opposite to the support surface 130 to the light control layer 11 to form the groove 120. The method of forming the groove 120 is the same as in the first embodiment. Then, the adhesive layer 45 and the protective layer 44 are laminated on the surface 131 of the first transparent support layer 13A.

The groove 120 may not be formed after formation of the laminate in which the light control layer 11 is sandwiched between the films 51A and 51B. The groove 120 may be formed in any step before formation of the laminate such as the step before the step of scattering the spacers on the film 51A, the step between the step of scattering the spacers 15 and the step of applying a light control material, or the step between the step of forming the light control layer 11A and the step of laminating the films 51A and 51B.

The second embodiment provides the following advantage in addition to the advantages in (1) to (3) of the first embodiment.

(5) In the above configuration, the groove 120 has a depth that allows the groove 120 to pass through the first transparent support layer 13A and the second transparent support layer; thus, the groove 120 can be formed after or during lamination of the first transparent support layer 13A, the first transparent electrode layer 12A, the light control layer, the second transparent electrode layer, and the second transparent support layer. This achieves a production process with higher flexibility.

Modifications

The above embodiments can be implemented with modifications as described below. The following modifications may be implemented in combination.

In the above embodiments, an aspect has been described in which the narrow portion 30A, that is, the conductive portion 26, connects the drive region 20B surrounded by the non-driven region 21 having a linear shape to the drive region 20A located outside the non-driven region 21; however, the present disclosure is not limited to this aspect.

Figure 9:
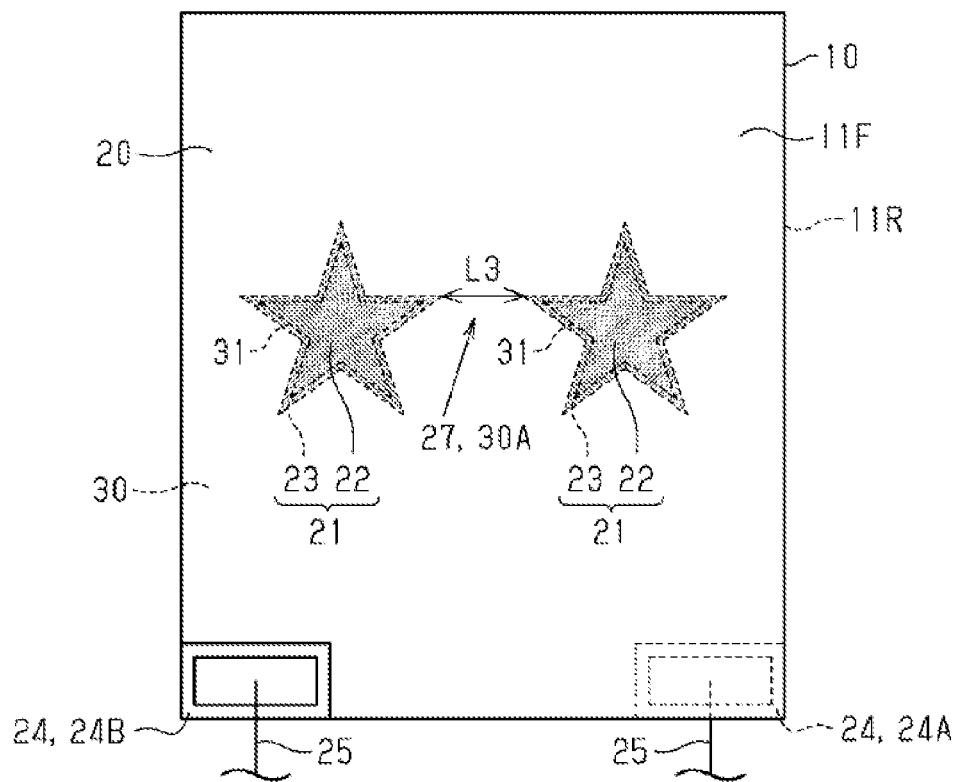
FIG. 9 is a front view of a light control sheet of a modification.

FIG. 9 shows the light control sheet 10 having multiple non-driven regions 21. The non-driven regions 21 are each composed of the floating region 22 and the boundary region 23. The boundary region 23 has a frame shape. The boundary region 23 defines the floating region 22 which is a closed region. In the example of the light control sheet 10 shown in FIG. 9, the boundary region 23 surrounds the floating region 22 having a star shape. The light control sheet 10 has the different non-driven regions 21 that are independent of each other. The narrow portion 30A located between different grooves 120 is provided between the non-driven regions 21. The narrow portion 30A is a portion of the driving electrode element 30 that has a small width due to the different non-driven regions 21 located close to each other. The narrow portion 30A is a conductive portion 27 that electrically connects portions of the drive region 20 around the narrow portion 30A. The narrow portion 30A has a width L3 of 1 mm or more. That is, a relative distance of 1 mm or more is provided between the different non-driven regions 21. If the width L3 of the narrow portion 30A is less than 1 mm, the narrow portion 30A has a low conductivity; thus, the portions of the drive region 20 that are connected via the narrow portion 30A may not have the same light transmittance. The light control sheet 10 shown in FIG. 9 has two non-driven regions 21; however, the light control sheet 10 may have three or more non-driven regions 21.

In the above embodiments, the groove 120 has a closed frame shape surrounding the floating electrode element 31. Instead of or in addition to this, the groove 120 may not have a closed frame shape surrounding the floating electrode element 31 as long as the groove 120 extends along the support surface 130 of the first transparent support layer 13A. For example, the groove 120 may extend from a starting point located at a first end portion on one of the four sides of the light control sheet 10 having a rectangular shape through an outer periphery of the floating region 22 to an end point located at a second end portion of the light control sheet 10. One of the four sides of the light control sheet 10 on which the second end portion is located may be the same as or different from the side of the light control sheet 10 on which the first end portion is located. In this aspect, when the light control sheet 10 does not have a rectangular shape, the starting point and the end point of the groove 120 may also be located at an end portion of the light control sheet 10.

In the above embodiments, the light control sheet 10 is a normal-type light control sheet; however, the light control sheet 10 may be a reverse-type light control sheet in which when no voltage signal is applied to the light control sheet, incident light is transmitted through the light control sheet to increase the translucency of the light control sheet and when a voltage signal is applied to the light control sheet, incident light is scattered to decrease the translucency of the light control sheet.

Figure 10:
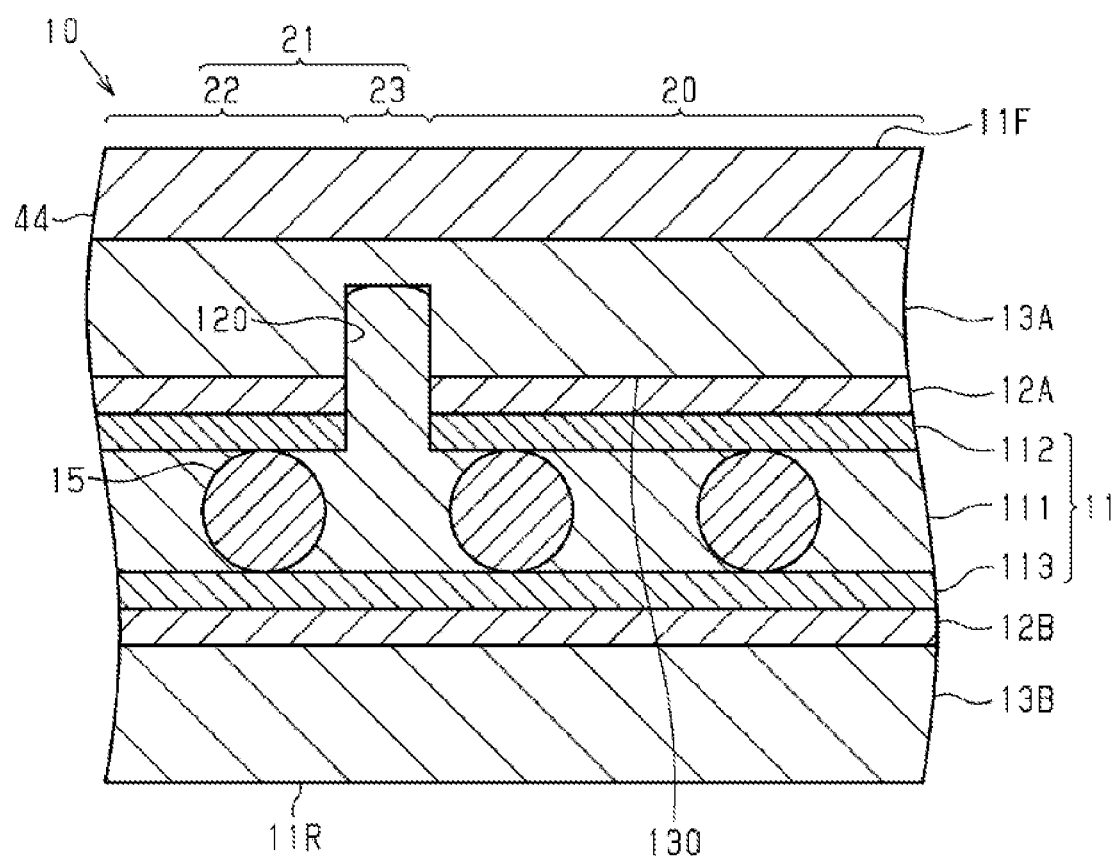
FIG. 10 is a cross-sectional view of a reverse-type light control sheet of a modification.

FIG. 10 shows an example of the light control sheet 10 as a reverse-type light control sheet. As shown in FIG. 10, the light control sheet 10 as a reverse-type light control sheet includes a functional layer 111 including a transparent polymer layer and a liquid crystal composition, a first alignment layer 112, and a second alignment layer 113. The first alignment layer 112 and the second alignment layer 113 constitute the light control layer 11. The first alignment layer 112 is located between the functional layer 111 and the first transparent electrode layer 12A and is in contact with these layers. The second alignment layer 113 is located between the light control layer 11 and the second transparent electrode layer 12B, and is in contact with these layers.

The first alignment layer 112 and the second alignment layer 113 are each, for example, a vertical alignment film or a horizontal alignment film. A vertical alignment film causes the major axes of liquid crystal molecules to be aligned in the thickness direction of the light control layer 11. A horizontal alignment film causes the major axes of liquid crystal molecules to be aligned in a direction substantially perpendicular to the thickness direction of the light control layer 11. Thus, the first alignment layer 112 and the second alignment layer 113 control the alignment of the liquid crystal molecules contained in the functional layer 111.

The material for forming each of the first alignment layer 112 and the second alignment layer 113 is an organic compound, an inorganic compound, or a mixture thereof. Examples of the organic compound include polyimide, polyamide, polyvinyl alcohol, and cyanide compounds. Examples of the inorganic compound include silicon oxide and zirconium oxide. The material for forming the first alignment layer 112 and the second alignment layer 113 may be silicone. Silicone is a compound having an inorganic portion and an organic portion.

The groove 120 has the opening 122 in a portion of the first alignment layer 112 facing the functional layer 111 and passes through the first alignment layer 112 and the first transparent electrode layer 12A but does not pass through the first transparent support layer 13A. That is, the depth of the groove 120 is smaller than the sum of the thickness of the first alignment layer 112, the thickness of the first transparent electrode layer 12A, and the thickness of the first transparent support layer 13A. The groove 120 contains a part of the functional layer 111. As in the second embodiment, the groove 120 may pass through the first transparent support layer 13A.

In the drive region 20 of the light control sheet 10 including the first alignment layer 112 and the second alignment layer 113, when no voltage signal is applied to the first transparent electrode layer 12A or the second transparent electrode layer 12B, the major axes of the liquid crystal molecules are aligned in the thickness direction of the light control layer 11. Thus, the drive region 20 is transparent. On the other hand, in the drive region 20, when a voltage signal is applied to the first transparent electrode layer 12A and the second transparent electrode layer 12B, the major axes of the liquid crystal molecules are aligned in a direction intersecting the thickness direction of the light control layer 11. Thus, the drive region 20 appears turbid and opaque. In the floating region 22 and the boundary region 23 of the light control sheet 10 including the first alignment layer 112 and the second alignment layer 113, the major axes of the liquid crystal molecules are always aligned in the thickness direction of the light control layer 11; thus, the non-driven region 21 is always transparent.

Therefore, when the light control sheet 10 is not driven, the drive region 20 and the non-driven region 21 are transparent, and an image of a character, pattern, or the like composed of the non-driven region 21 is not visually recognized. On the other hand, when the light control sheet is driven, the drive region 20 is opaque and the non-driven region 21 is transparent; thus, an image of a character, pattern, or the like composed of the non-driven region 21 can be visually recognized.

Thus, even in the light control sheet 10 including the first alignment layer 112 and the second alignment layer 113, the surface of the light control sheet 10 has the regions different in light transmittance from each other, and the difference in light transmittance between the regions is shown only when the light control sheet 10 is driven. This allows the light control sheet 10 to have improved designability.

In the above aspect, the groove 120 passes through the first alignment layer 112; however, the first alignment layer 112 may be formed after the groove 120 is formed in a laminate composed of the first transparent electrode layer 12A and the first transparent support layer 13A. In such a case, the first alignment layer 112 is formed along the bottom surface and side surface of the groove 120. This also enables the groove 120 to be less conspicuous when viewed externally.

Figure 11:
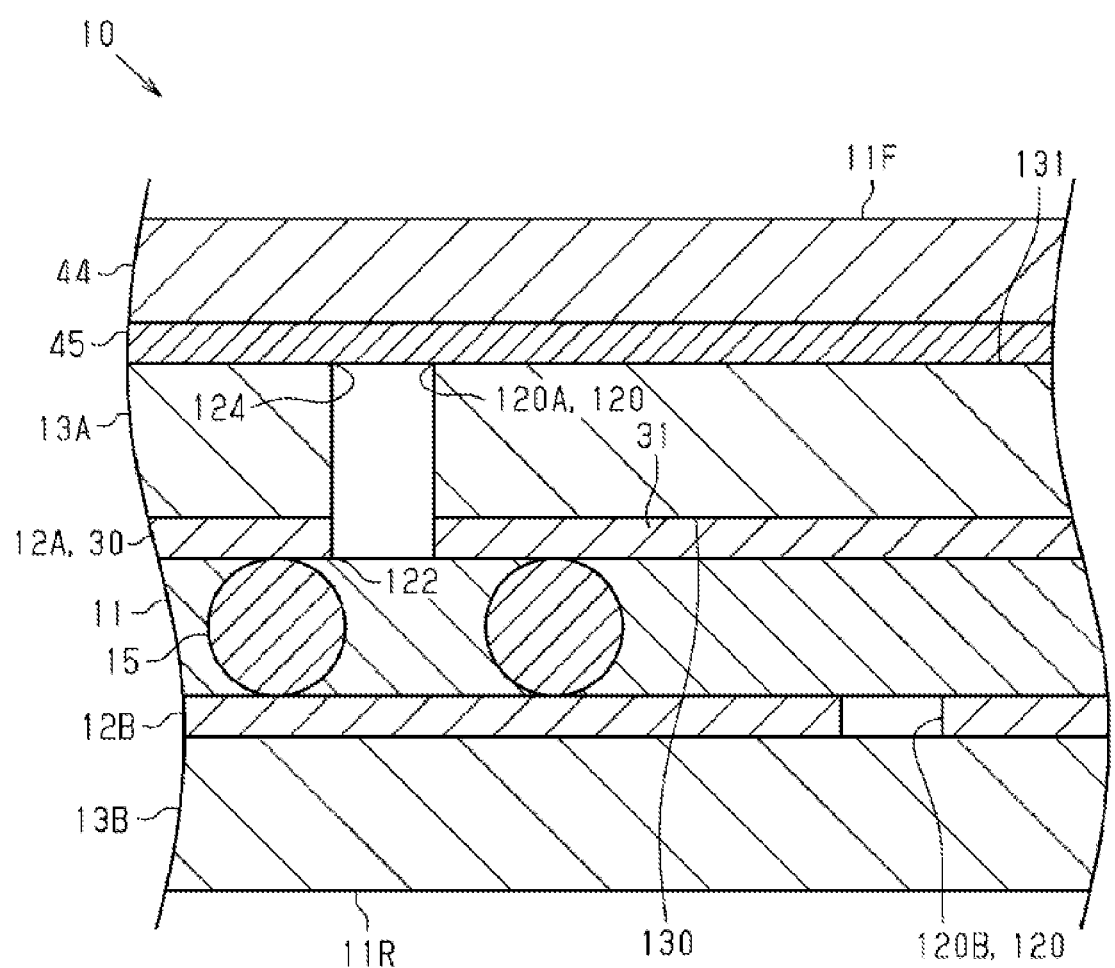
FIG. 11 is a cross-sectional view of a light control sheet of a modification.
Figure 12:
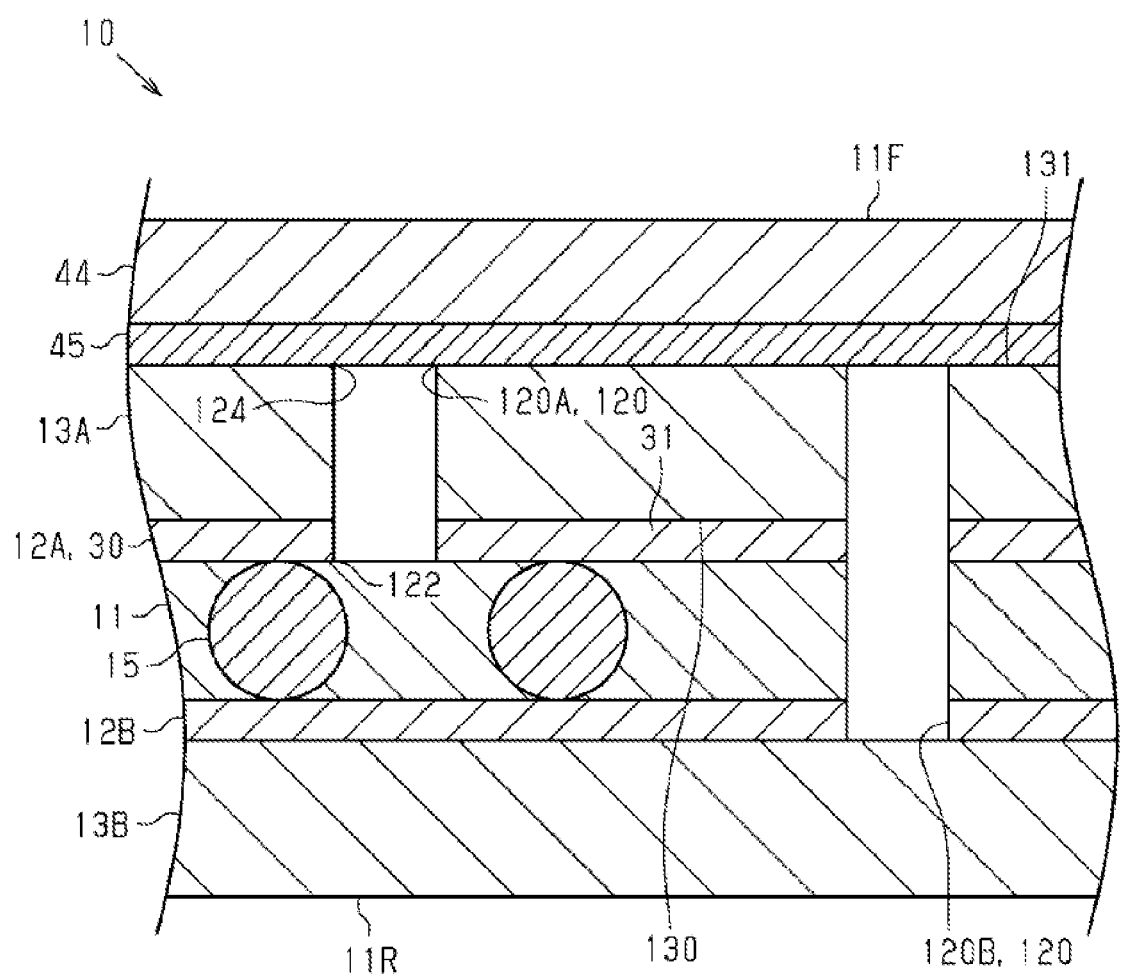
FIG. 12 is a cross-sectional view of a light control sheet of a modification.
Figure 13:
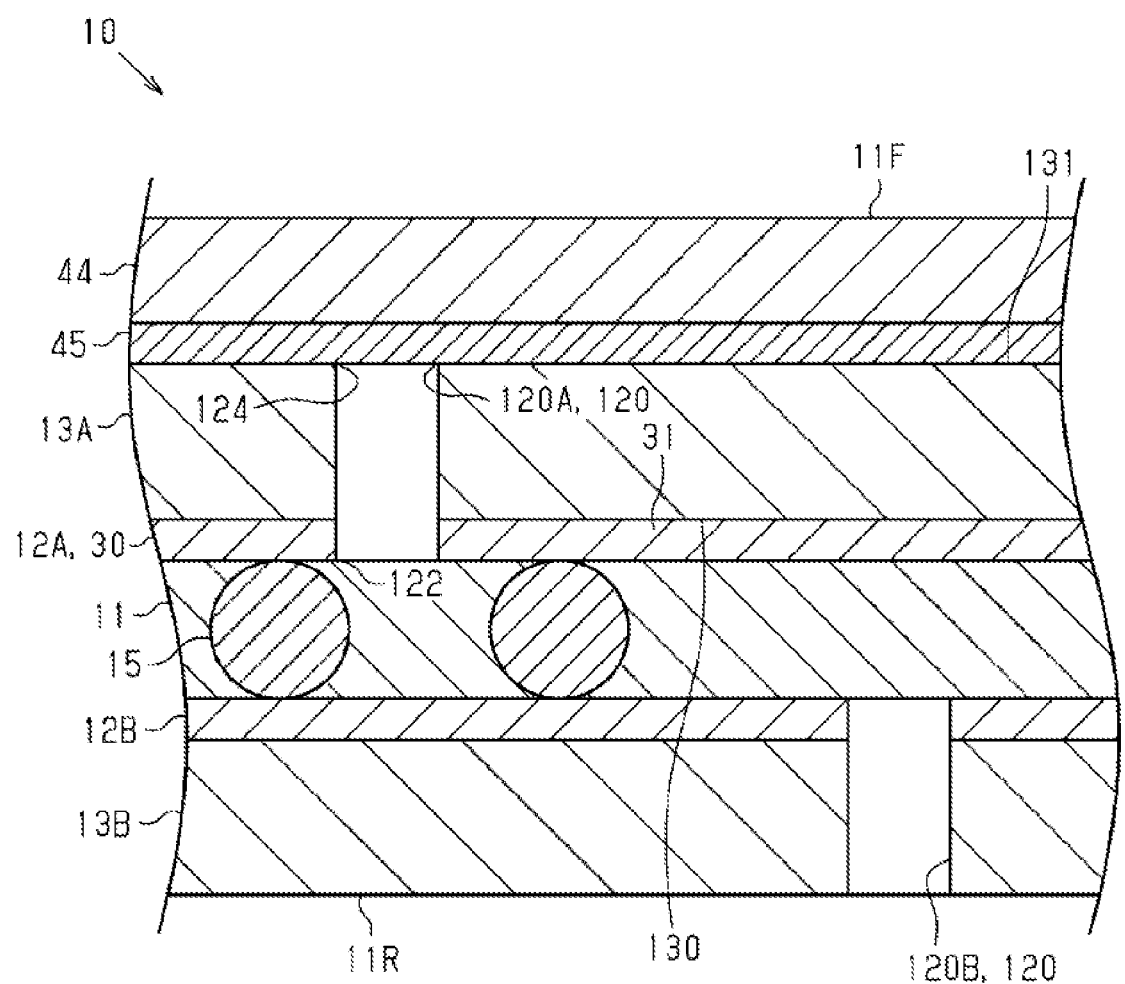
FIG. 13 is a cross-sectional view of a light control sheet of a modification.

In the above embodiments, in the light control sheet 10 having the grooves 120, the grooves 120 are located at the same depth in the lamination direction (thickness direction) of the layers constituting the light control sheet 10. Instead of or in addition to this, the grooves 120 may be located at different depths in the lamination direction. FIGS. 11 to 13 show examples of the light control sheet 10 having the grooves 120 located at different depths in the lamination direction, and the grooves 120 in each of the examples may be formed by the method of forming the groove 120 of the above embodiments. FIGS. 11 to 13 show the light control sheet 10 as a normal-type light control sheet; however, the light control sheet 10 may be a reverse-type light control sheet. Furthermore, in FIGS. 11 to 13, the grooves 120 do not contain light control material; however, at least part of the grooves 120 may contain a light control material.

In FIG. 11, one groove 120A passes through the first transparent support layer 13A and the first transparent electrode layer 12A. The other groove 120B passes through only the second transparent electrode layer 12B. The groove 120B may be formed from the side where the second transparent support layer 13B is located using a laser cutting device or the like.

FIG. 12 shows another example of the light control sheet 10 in which the grooves 120 are located at different positions in the lamination direction of the light control sheet 10. In this example, the grooves 120 are formed by making a slit in the light control sheet 10 from the side of the first transparent support layer 13A. One groove 120A passes through the first transparent support layer 13A and the first transparent electrode layer 12A. The other groove 120B passes through the light control layer 11 and the second transparent electrode layer 12B in addition to the first transparent support layer 13A and the first transparent electrode layer 12A. In the light control layer 11, the groove 120 may be filled with a light control material.

FIG. 13 shows another example of the light control sheet 10 in which the grooves 120 are located at different positions in the lamination direction. One groove 120A passes through the first transparent support layer 13A and the first transparent electrode layer 12A. The other groove 120B passes through the second transparent support layer 13B and the second transparent electrode layer 12B.

In each of the above examples of the light control sheet 10, the grooves 120A and 120B may be formed not to overlap with each other when the light control sheet 10 is viewed from the first surface 11F or when the light control sheet 10 is viewed from the second surface 11R. The boundary region 23 is a region in which the groove 120A is located and a region in which the groove 120B is located. The light control sheet 10 having the grooves 120A and 120B located close to each other tends to have low strength in and around the region located between the grooves 120A and 120B. However, in the light control sheet 10 having the grooves 120 located at different positions in the lamination direction as in the above examples, even when the grooves 120A and 120B are located close to each other, it is possible to prevent the light control sheet 10 from having low strength.

In the above embodiments, a voltage signal is applied to the drive electrode element 30 which is the first electrode element, and no voltage signal is applied to the floating electrode element 31 which is the second electrode element. Instead, a voltage signal may be separately applied to the first electrode element and the second electrode element. In such a case, wiring for applying a voltage signal to the second electrode element is connected to an end portion of the second electrode element. A terminal portion connected to the first electrode element and a terminal portion connected to the second electrode element are different terminal portions for respective voltage signals. As described above, in the configuration in which the second electrode element is located at the end portion of the light control sheet 10, wiring is easily connected to the second electrode element. For example, a first region in which the first electrode element is located is switched between the transparent state and the opaque state by switching the application state of a voltage signal to the first electrode element. A second region in which the second electrode element is located is switched between the transparent state and the opaque state independently from the first region by switching the application state of a voltage signal to the second electrode element. Such a configuration allows the light control sheet 10 to be switched among four states: the state in which the first region and the second region are both opaque, the state in which the first region is opaque and the second region is transparent, the state in which the first region is transparent and the second region is opaque, and the state in which the first region and the second region are both opaque. This enables the decoration state of the space by the light control sheet 10 to be more variously changed, allowing the light control sheet 10 to have further improved designability.

The light transmittance of at least one of the first region and the second region may be controlled to be a light transmittance between the light transmittance at which the region is transparent and the light transmittance at which the region is opaque. In the light control sheet 10 including the light control layer 11 containing a liquid crystal composition, when the potential difference between the first transparent electrode layer 12A and the second transparent electrode layer 12B is in a predetermined range, the light transmittance of the light control sheet 10 is gradually changed according to a change in the potential difference. Thus, in the first region or the second region, by controlling the potential difference between the first transparent electrode layer 12A and the second transparent electrode layer 12B to be a value between the potential difference at which the region is transparent and the potential difference at which the region is opaque, it is possible to control the region to have a light transmittance between the light transmittance at which the region is transparent and the light transmittance at which the region is opaque, that is, it is possible to control the region to be translucent.

Specifically, for example, the first region is switched between the transparent state and the opaque state by switching the application state of a voltage signal to the first electrode element, and the second region is switched between the translucent state and the opaque state by switching the application state of a voltage signal to the second electrode element. When the first region is transparent, the second region is controlled to be translucent. Such a configuration enables the light control sheet 10 to be switched between the state in which the first region and the second region are both opaque and the state in which the first region is opaque and the second region is translucent. This also allows the light control sheet 10 to have improved designability.

Figure 14:
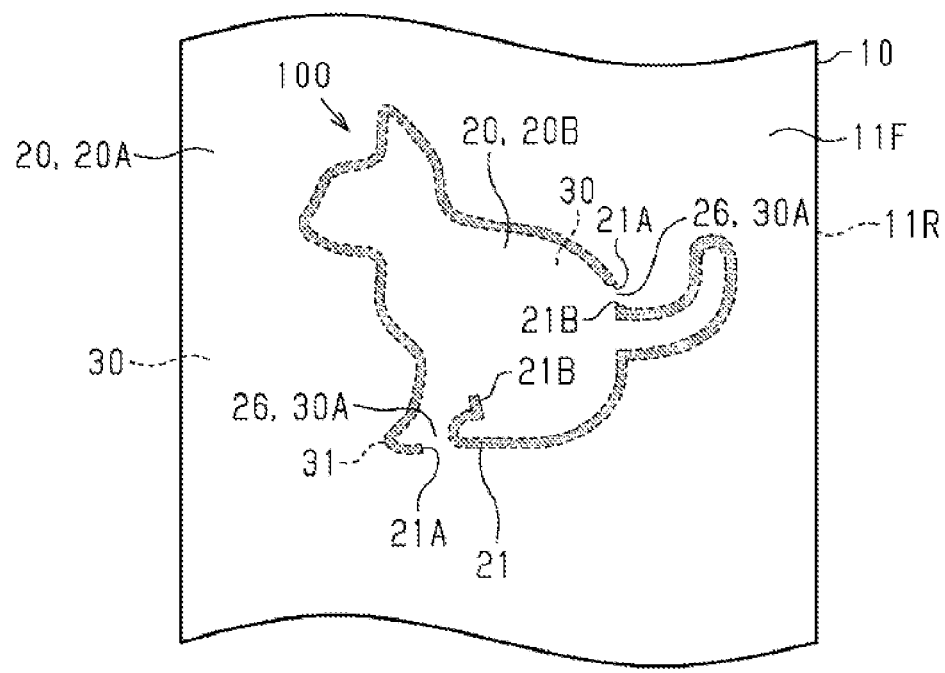
FIG. 14 is a front view of a light control sheet of a modification.

In the first embodiment, the drive regions 20A and 20B defined by the non-driven region 21 are electrically connected to each other via the single narrow portion 30A. Instead, the drive regions 20A and 20B defined by the non-driven region 21 may be electrically connected to each other via multiple narrow portions 30A. In other words, the drive electrode element 30 has multiple conductive portions 26 each of which is located between portions of the non-driven region 21. The narrow portions 30A have the same configuration as in the first embodiment. For example, as shown in FIG. 14, the drive regions 20A and 20B may be electrically connected to each other via two narrow portions 30A. The narrow portions 30A have a width of 1 mm or more.

Figure 15:
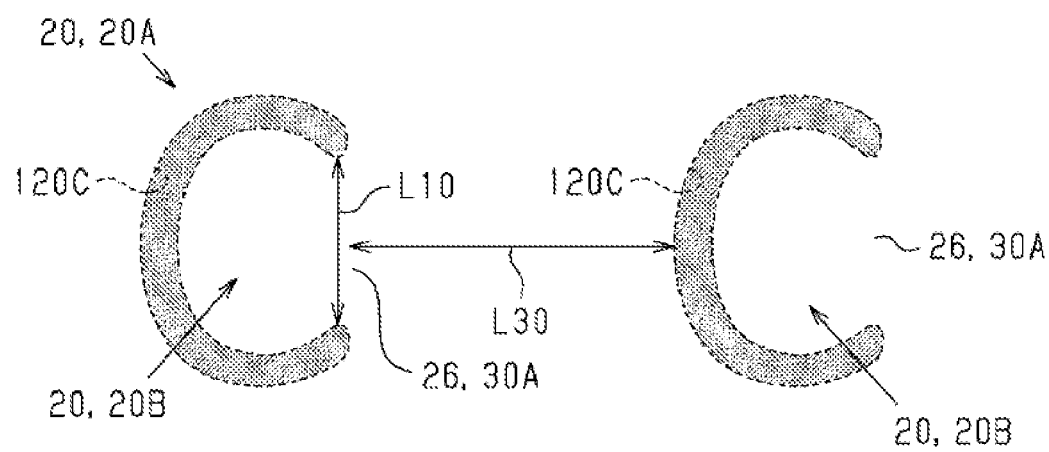
FIG. 15 is a front view of a light control sheet of a modification.

As an aspect of the light control sheet 10 displays a design when the light control sheet is driven, the light control sheet 10 may include the first electrode element and a groove 120C having a large width. In an aspect shown in FIG. 15, the light control sheet 10 includes the first electrode element whose light transmittance is changed according to the application state of a voltage signal and the groove 120C having a large width, and does not include the second electrode element. The groove 120C having a large width can be rephrased as a concave portion. In the example shown in FIG. 15, the groove 120C forms the shape of the entire letter "C". The region in which the groove 120C is located includes no electrode element. The groove 120C contains at least one of a liquid crystal composition, a transparent polymer layer, and a liquid crystal composition. Alternatively, the groove 120C may contain a material other than a transparent polymer layer and a liquid crystal composition, or may be a void containing no material. When the light control sheet 10 is not driven, the drive region 20 in which the groove 120C is not located and the groove 120C are both opaque. When the light control sheet 10 is driven, the drive region is transparent and the groove 120C is opaque. Therefore, only the groove 120C appears, for example, whitish and turbid, and an image of the design such as a character or pattern composed of the groove 120C can be visually recognized. In the example shown in FIG. 15, the letter "C" can be visually recognized. In the light control sheet 10 having multiple grooves 120C, a width L30 of the narrow portion 30A defined by the grooves 120C is 1 mm or more. Furthermore, a width L10 of the narrow portion 30A formed of one of the grooves 120C is 1 mm or more. The definition of the narrow portion 30A is the same as in the above embodiments.

Figure 16:
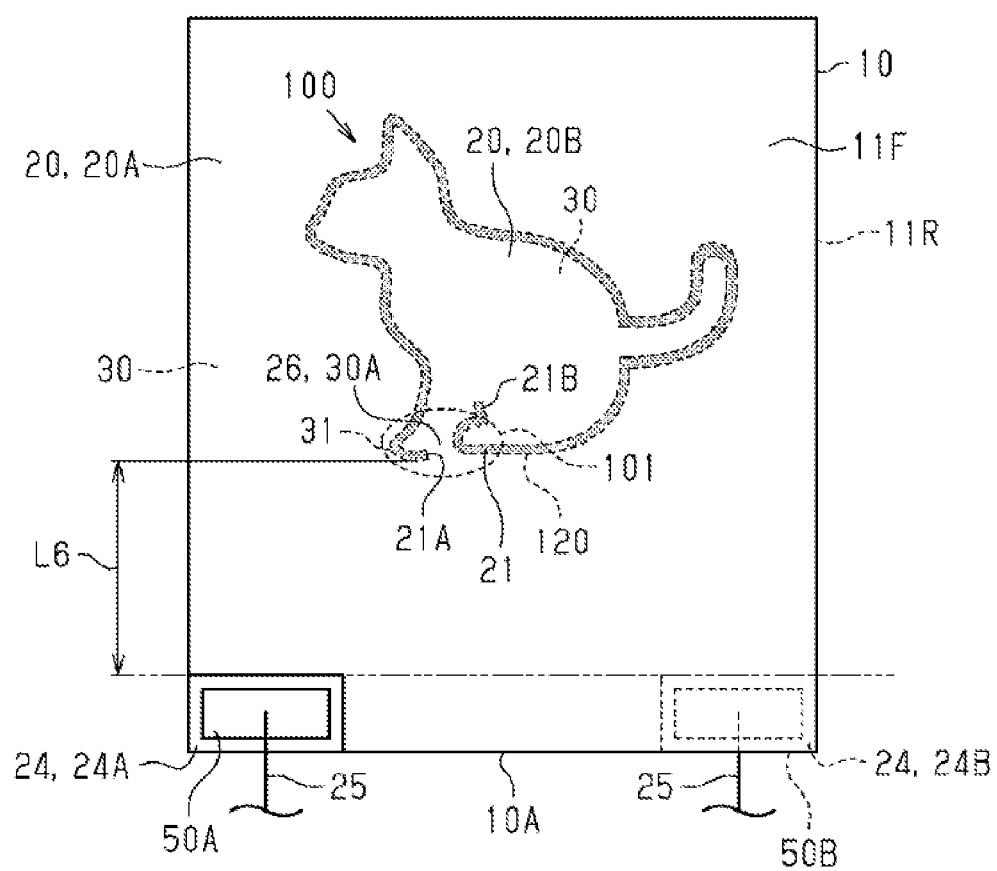
FIG. 16 is a front view of a light control sheet of a modification.

As shown in FIG. 16, the first connection region 24A which is an example of the non-driven region includes the first terminal portion 50A and is framed by a portion of the first transparent electrode layer 12A that is exposed from the light control layer 11. The second connection region 24B which is another example of the non-driven region includes the second terminal portion 50B, and is framed by a portion of the second transparent electrode layer 12B that is exposed from the light control layer 11. The first connection region 24A and the second connection region 24B are formed in a first direction. The first direction is a direction in which an end side 10A of the light control sheet 10 extends, and is the horizontal direction in FIG. 16. A relative distance L6 is the minimum distance between a straight line that passes through the groove 120 and extends in the first direction and a straight line that passes through the first connection region 24A and extends in the first direction. When the light control sheet 10 is required to have a uniform voltage, the relative distance L6 is preferably 5 mm or more and 50 mm or less, and more preferably 5 mm or more and 20 mm or less. That is, the relative distance L6 is the distance between the groove 120 and each of the first connection region 24A and the second connection region 24B in a direction perpendicular to the end side 10A of the light control sheet 10.

In the light control sheet 10 in which a floating element ratio in a unit region is 30% or more, the voltage between the first terminal portion 50A and the second terminal portion 50B is more likely to be non-uniform. Thus, when the light control sheet 10 in which the floating element ratio in the unit region is 30% or more is required to have a uniform voltage, the relative distance L6 is particularly preferably 5 mm or more and 50 mm or less. Here, the unit region is a region adjacent to the first connection region 24A and a region adjacent to the second connection region 24B. The unit region is separated from the first connection region 24A by a straight line that passes through the first connection region 24A and extends in the first direction. The unit region has a length of 100 mm in the first direction and has a length of 100 mm in a second direction perpendicular to the first direction. The floating element ratio is a ratio of the area of the floating electrode element 31 to the sum of the areas of the drive electrode element 30 which is the first electrode element and the floating electrode element 31 which is the second electrode element.

In the narrow portion 30A, the separation strength of a layer supporting the light control layer 11 with respect to the light control layer 11 is preferably 0.01 N or more. The separation strength in a portion of the light control sheet 10 that includes the narrow portion 30A is measured by a method in accordance with JIS A 5759: 2016"6.9.3a) 180-degree separation test". In the light control sheet 10 as a normal-type light control sheet, the separation strength of the layer supporting the light control layer 11 with respect to the light control layer 11 is the separation strength of the first transparent electrode layer 12A with respect to the light control layer 11. In the light control sheet 10 as a reverse-type light control sheet, the separation strength of the layer supporting the light control layer 11 with respect to the light control layer 11 is the separation strength of the first alignment layer 112 with respect to the light control layer 11. In this aspect, it is possible to prevent the layer supporting the light control layer 11 from being peeled off in the narrow portion 30A. More preferably, the narrow portion 30A has a width of 2 mm or more, and has a separation strength of 0.1 N or more per unit width (10 mm). In this aspect, it is possible to further prevent the layer supporting the light control layer 11 from being peeled off in the narrow portion 30A.

In the film 51A in which the narrow portion 30A is not yet formed (see FIG. 6), the separation strength of the layer supporting the light control layer 11 with respect to the light control layer 11 is preferably 0.4 N/25 mm or more. In the film 51A, the narrow portion 30A having a width of 2 mm or more is formed. The separation strength is measured by a method in accordance with JIS A 5759: 2016"6.9.3a) 180-degree separation test". Thus, even in the light control sheet 11 including the narrow portion 30A having a small width of approximately 2 mm, it is possible to prevent the layer from being peeled off in the narrow portion 30A.

EXAMPLES

Preparation of Measurement Sample 1

Example 1

Examples which are examples of the above embodiments will be specifically described. The present disclosure is not limited to these examples.

Figures 17, 18, 19:
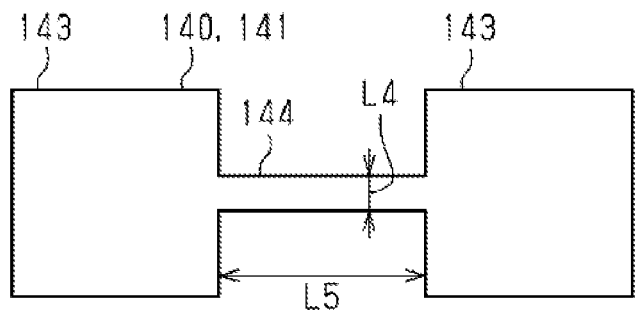
FIG. 17 is a diagram showing an example for measuring a resistance value.
FIG. 18 is a view showing the resistance values of examples and a comparative example.
FIG. 19 is a view showing the effective voltages of examples and a comparative example.

As shown in FIG. 17, in a substrate including a transparent electrode layer 140 and a transparent support layer 141, two resistance value measurement regions 143 having a rectangular shape were formed. The resistance value measurement regions 143 had a size of 50 mm×25 mm. The two resistance value measurement regions 143 were connected via a narrow portion 144 (conductive portion) having a width L4 of 50 mm and a length L5 of 100 mm to prepare a measurement sample. Furthermore, a tester was connected to the two resistance value measurement regions 143, and the resistance value of the measurement sample was measured.

Example 2

A measurement sample was prepared in the same manner as in Example 1, except that the narrow portion 144 had a width L4 of 30 mm.

Example 3

A measurement sample was prepared in the same manner as in Example 1, except that the narrow portion 144 had a width L4 of 10 mm.

Example 4

A measurement sample was prepared in the same manner as in Example 1, except that the narrow portion 144 had a width L4 of 5 mm.

Example 5

A measurement sample was prepared in the same manner as in Example 1, except that the narrow portion 144 had a width L4 of 2 mm.

Example 6

A measurement sample was prepared in the same manner as in Example 1, except that the narrow portion 144 had a width L4 of 1 mm.

Comparative Example 1

A measurement sample was prepared in the same manner as in Example 1, except that the narrow portion 144 had a width L4 of 0.5 mm.

Measurement and Evaluation of Resistance Value

The resistance value was measured using a digital multimeter (TY530 manufactured by Yokogawa Test & Measurement Corporation).

As shown in FIG. 18, the measurement samples of Examples 1 to 6 had a resistance value (Ω) of "494", "719", "1,225", "2,259", "5,220", and "10,900", and the measurement samples in which the narrow portion 144 had a smaller width L4 had higher resistance values. The measurement sample of Comparative Example 1 had a resistance value of "26,800", which was significantly higher than the resistance values of Examples 1 to 6.

Preparation of Measurement Sample 2

Next, the effective voltage was measured on a light control sheet in which a light control layer was sandwiched between a pair of substrates.

Example 7

A light control sheet having the same laminated structure as the light control sheet 10 shown in FIG. 2 was prepared. In the light control sheet, two characteristic measurement regions having a rectangular shape with a size of 50 mm×25 mm were formed to be separated from each other, and the characteristic measurement regions were connected by a narrow portion. The narrow portion had a width of 50 mm and a length of 100 mm. Furthermore, as in the light control sheet shown in FIG. 2, a slit was made in a corner portion of one surface (second surface) of the light control sheet, and the transparent support layer and the transparent electrode layer were peeled off and the liquid crystal was removed in the corner portion to form a connection region. Similarly, a slit was made in a corner portion of one surface (first surface) of the light control sheet, and the transparent support layer and the transparent electrode layer were peeled off and the liquid crystal was removed in the corner portion to form a connection region. Then, external wirings were connected to the connection regions to enable the voltage applied to the characteristic measurement regions to be controllable.

Example 8

A measurement sample was prepared in the same manner as in Example 7, except that the narrow portion had a width of 30 mm.

Example 9

A measurement sample was prepared in the same manner as in Example 7, except that the narrow portion had a width of 10 mm.

Example 10

A measurement sample was prepared in the same manner as in Example 7, except that the narrow portion had a width of 5 mm.

Example 11

A measurement sample was prepared in the same manner as in Example 7, except that the narrow portion had a width of 2 mm.

Example 12

A measurement sample was prepared in the same manner as in Example 7, except that the narrow portion had a width of 1 mm.

Comparative Example 2

A measurement sample was prepared in the same manner as in Example 7, except that the narrow portion had a width of 0.5 mm.

Measurement and Evaluation of Effective Voltage

A rectangular-wave voltage of 80 V with a frequency of 40 Hz was applied to the characteristic measurement regions of the measurement samples using a power supply device (LP1-RS232 manufactured by Toppan Inc.), and the effective voltage was measured using the device.

As shown in FIG. 19, in the measurement samples of Examples 7 to 12 in which the conductive portion had a width of 1.0 mm or more, the effective voltage was 79.6 to 81.4 (V), and there was no significant difference in the effective voltage, although the effective voltages were smaller in the measurement samples in which the narrow portion had a smaller width. In the measurement sample of Comparative Example 2 in which the narrow portion had a width of 0.5 mm, the effective voltage was "7.9 V", which was significantly reduced. In the measurement sample of Comparative Example 2, repeated on-off switching of the voltage caused a conduction failure.

A light control sheet includes a light control layer containing a liquid crystal composition, and a pair of transparent electrode layers sandwiching the light control layer. A drive voltage is applied between the pair of transparent electrode layers. The alignment of liquid crystal molecules of the liquid crystal composition is changed according to a potential difference between the transparent electrode layers, leading to a change in light transmittance of the light control sheet. For example, when the major axes of the liquid crystal molecules are aligned in the thickness direction of the light control layer, the light control sheet is colorless and transparent, and has a high light transmittance. When the major axes of the liquid crystal molecules intersect the thickness direction of the light control layer, light is scattered in the light control layer, and the light control sheet has a low light transmittance (see, for example, JP 2018-45135 A).

Light control sheets are adhered to members for partitioning spaces, for example, construction materials such as window glasses or partitions of buildings, or window glasses of vehicles, and are used as a part of such members. In recent years, in order to improve the added value of light control sheets, the designability of light control sheets has been attracting attention. Improvement in the designability of light control sheets can significantly increase the applicability of light control sheets and create new demand for space to be light controlled. Thus, light control sheets having improved designability are to be developed.

An aspect of the present disclosure provides a light control sheet. The light control sheet includes a first transparent electrode layer, a second transparent electrode layer, a light control layer that is located between the first transparent electrode layer and the second transparent electrode layer, a first transparent support layer that is located on a side of the first transparent electrode layer facing away from the light control layer and has a support surface that supports the first transparent electrode layer, and a second transparent support layer that is located on a side of the second transparent electrode layer facing away from the light control layer, wherein the first transparent electrode layer includes a first electrode element and a second electrode element, the first electrode element and the second electrode element are layer members formed separately along the support surface, and are electrically insulated from each other by a groove extending along the support surface, the first electrode element has a narrow portion that is located between portions of the groove, and the narrow portion has a width of 1 mm or more.

Another aspect of the present disclosure provides a light control sheet. The light control sheet includes a first transparent electrode layer, a second transparent electrode layer, a light control layer that is located between the first transparent electrode layer and the second transparent electrode layer, a first transparent support layer that is located on a side of the first transparent electrode layer facing away from the light control layer and has a support surface that supports the first transparent electrode layer, and a second transparent support layer that is located on a side of the second transparent electrode layer facing away from the light control layer, wherein the first transparent electrode layer includes a first electrode element and a second electrode element, the first electrode element and the second electrode element are layer members formed separately along the support surface, and are electrically insulated from each other by a groove extending along the support surface, the groove has a curved portion, the first electrode element has a narrow portion that is located on an inner side of the curved portion, and the narrow portion has a width of 1 mm or more.

Another aspect of the present disclosure provides a light control sheet. The light control sheet includes a first transparent electrode layer, a second transparent electrode layer, a light control layer that is located between the first transparent electrode layer and the second transparent electrode layer, a first transparent support layer that is located on a side of the first transparent electrode layer facing away from the light control layer and has a support surface that supports the first transparent electrode layer, and a second transparent support layer that is located on a side of the second transparent electrode layer facing away from the light control layer, wherein the first transparent electrode layer includes a first electrode element and multiple second electrode elements, the first electrode element and the second electrode elements are layer members formed separately along the support surface, and each of the electrode elements is electrically insulated from other electrode elements by grooves extending along the support surface, a narrow portion is located between one of the grooves that defines one of the second electrode elements and another one of the grooves that defines another one of the second electrode elements, and the narrow portion has a width of 1 mm or more.

Another aspect of the present disclosure provides a method of producing a light control sheet. The method of producing a light control sheet includes the steps of forming a groove in a first film including a first transparent support layer and a first transparent electrode layer supported by the first transparent support layer to form a first electrode element and a second electrode element electrically insulated from each other by the groove in the first transparent electrode layer, the groove passing through at least the first transparent electrode layer, and forming a light control layer between the first film and a second film including a second transparent support layer and a second transparent electrode layer supported by the second transparent support layer, wherein the step of forming a groove is performed so that the first electrode element has a narrow portion that is located between portions of the groove and that has a width of 1 mm or more.

Another aspect of the present disclosure provides a method of producing a light control sheet. The method of producing a light control sheet includes the steps of forming a groove in a first film including a first transparent support layer and a first transparent electrode layer supported by the first transparent support layer to form a first electrode element and a second electrode element electrically insulated from each other by the groove in the first transparent electrode layer, the groove passing through at least the first transparent electrode layer, and forming a light control layer between the first film and a second film including a second transparent support layer and a second transparent electrode layer supported by the second transparent support layer, wherein the step of forming a groove is performed so that the groove having a curved portion is formed and that the first electrode element has a narrow portion that is defined on an inner side of the curved portion and that has a width of 1 mm or more.

Another aspect of the present disclosure provides a method of producing a light control sheet. The method of producing a light control sheet includes the steps of forming grooves in a first film including a first transparent support layer and a first transparent electrode layer supported by the first transparent support layer to form a first electrode element and multiple second electrode elements electrically insulated from each other by the grooves in the first transparent electrode layer, the grooves passing through at least the first transparent electrode layer, and forming a light control layer between the first film and a second film including a second transparent support layer and a second transparent electrode layer supported by the second transparent support layer, wherein the step of forming grooves is performed so that a narrow portion is located between one of the grooves that defines one of the second electrode elements and another one of the grooves that defines another one of the second electrode elements and that the narrow portion has a width of 1 mm or more.

Obviously, numerous modifications and variations of the present invention are possible in light of the above teachings. It is therefore to be understood that within the scope of the appended claims, the invention may be practiced otherwise than as specifically described herein.

What is claimed is:

1. A light control sheet, comprising:
a plurality of electrode layers comprising first transparent electrode layer and a second transparent electrode layer;
a light control layer formed between the first transparent electrode layer and the second transparent electrode layer; and
a plurality of transparent support layers comprising a first transparent support layer and a second transparent support layer such that the first transparent support layer is formed on the first transparent electrode layer on an opposite side with respect to the light control layer and has a support surface supporting the first transparent electrode layer and that the second transparent support layer is formed the second transparent electrode layer on an opposite side with respect to the light control layer,
wherein the first transparent electrode layer has at least one groove extending along the support surface such that the at least one groove has a depth extending into the first transparent support layer and that the first transparent electrode layer has an electrode element having a narrow portion formed between portions of the at least one groove and having a width of 1 mm or more.

2. The light control sheet according to claim 1, wherein the first transparent electrode layer includes the electrode element and a second electrode element such that the electrode element and the second electrode element are formed separately along the support surface of the first transparent support layer and electrically insulated from each other by the at least one groove extending along the support surface and that the electrode element has the narrow portion formed between the portions of the at least one groove.

3. The light control sheet according to claim 2, wherein an angle of a curved portion of the electrode element or the second electrode element or an angle formed by tangent lines of the curved portion is 10 degrees or more.

4. The light control sheet according to claim 2, wherein the first transparent electrode layer is formed such that the at least one groove has an opening on a surface of the first transparent electrode layer facing the light control layer, and the at least one groove has a depth passing through the first transparent electrode layer and not passing through the first transparent support layer.

5. The light control sheet according to claim 2, wherein the first transparent electrode layer is formed such that the at least one groove has an opening on a surface of the first transparent support layer facing the light control layer, and the at least one groove has a depth passing through the first transparent support layer and the first transparent electrode layer.

6. The light control sheet according to claim 2, wherein a separation strength of a layer supporting the light control layer with respect to the light control layer in the narrow portion is 0.01 N or more.

7. The light control sheet according to claim 2, comprising:
a first connection region including a first terminal portion configured to apply a voltage to the first transparent electrode layer and framed by a portion of the first transparent electrode layer exposed from the light control layer; and
a second connection region including a second terminal portion configured to apply a voltage to the second transparent electrode layer and framed by a portion of the second transparent electrode layer that is exposed from the light control layer,
wherein the first connection region and the second connection region are formed in a first direction such that a minimum distance between a straight line passing through the first connection region in the first direction and a straight line passing through the at least one groove in the first direction is in a range of 5 mm to 50 mm.

8. The light control sheet according to claim 1, wherein the at least one groove has light transmittance that is not changed according to an application state of a voltage signal, and the electrode element that is defined by the at least one groove and has light transmittance that is changed according to an application state of a voltage signal.

9. The light control sheet according to claim 1, wherein the first transparent electrode layer includes the electrode element and a second electrode element such that the electrode element and the second electrode element are formed separately along the support surface and electrically insulated from each other by the at least one groove extending along the support surface, and the at least one groove has a curved portion such that the narrow portion of the electrode element is formed on an inner side of the curved portion.

10. The light control sheet according to claim 1, wherein the first transparent electrode layer is formed such that the at least one groove includes a plurality of grooves extending along the support surface of the first transparent support layer, and the first transparent electrode layer includes the electrode element and a plurality of second electrode elements such that the electrode element and the second electrode elements are formed separately along the support surface and that each of the electrode and second electrode elements is electrically insulated from each other by the grooves, and the narrow portion of the electrode element is formed between one of the grooves defining one of the second electrode elements and another one of the grooves defining another one of the second electrode elements.

11. A light control sheet according to claim 2, comprising:
a plurality of electrode layers comprising first transparent electrode layer and a second transparent electrode layer;
a light control layer formed between the first transparent electrode layer and the second transparent electrode layer; and
a plurality of transparent support layers comprising a first transparent support layer and a second transparent support layer such that the first transparent support layer is formed on the first transparent electrode layer on an opposite side with respect to the light control layer and has a support surface supporting the first transparent electrode layer and that the second transparent support layer is formed the second transparent electrode layer on an opposite side with respect to the light control layer,
wherein the first transparent electrode layer has at least one groove extending along the support surface such that the first transparent electrode layer has an electrode element having a narrow portion formed between portions of the at least one groove and having a width of 1 mm or more, the first transparent electrode layer includes the electrode element and a second electrode element such that the electrode element and the second electrode element are formed separately along the support surface of the first transparent support layer and electrically insulated from each other by the at least one groove extending along the support surface and that the electrode element has the narrow portion formed between the portions of the at least one groove, the electrode element has light transmittance that is changed according to an application state of a voltage signal, the electrode element is divided into an inner region and an outer region defined by the second electrode element and the at least one groove formed along the second electrode element such that the inner region is surrounded by the second electrode element and the at least one groove, the outer region is formed adjacent to the inner region via the second electrode element and the at least one groove, and the inner region is connected to the outer region by the narrow portion.

12. The light control sheet according to claim 11, wherein the first transparent electrode layer is formed such that the narrow portion of the electrode element is formed in a plurality and that the inner region includes the plurality of narrow portions connecting the inner region to the outer region.

13. The light control sheet according to claim 11, wherein an angle of a curved portion of the electrode element or the second electrode element or an angle formed by tangent lines of the curved portion is 10 degrees or more.

14. The light control sheet according to claim 11, wherein the first transparent electrode layer is formed such that the at least one groove has an opening on a surface of the first transparent electrode layer facing the light control layer, and the at least one groove has a depth passing through the first transparent electrode layer and not passing through the first transparent support layer.

15. A method of producing a light control sheet, comprising:
forming at least one groove in a first film including a first transparent support layer and a first transparent electrode layer supported by the first transparent support layer such that the at least one groove passes through at least the first transparent electrode layer and forms an electrode element in the first transparent electrode layer; and
forming a light control layer between the first film and a second film including a second transparent support layer and a second transparent electrode layer supported by the second transparent support layer,
wherein the at least one groove is formed such that the at least one groove has a depth extending into the first transparent support layer and that the electrode element has a narrow portion formed between portions of the at least one groove and having a width of 1 mm or more.

16. The method of producing a light control sheet according to claim 15, wherein the forming of the at least one groove comprises forming a groove in the first film such that the electrode element and a second electrode element electrically insulated from each other by the at least one groove are formed in the first transparent electrode layer.

17. The method of producing a light control sheet according to claim 16, wherein the first film includes a layer supporting the light control layer having a separation strength of 0.4 N/25 mm or more with respect to the light control layer, and the first electrode element has the narrow portion formed between portions of the at least one groove and having a width of 2 mm or more.

18. The method of producing a light control sheet according to claim 15, wherein the forming of the at least one groove comprises forming a groove in the first film such that the electrode element and a second electrode element electrically insulated from each other by the groove are formed in the first transparent electrode layer and that the groove has a curved portion and that the electrode element has the narrow portion defined on an inner side of the curved portion.

19. The method of producing a light control sheet according to claim 15, wherein the forming of the at least one groove comprises forming a plurality of grooves in the first film such that the plurality of grooves passes through at least the first transparent electrode layer, the electrode element and a plurality of second electrode elements electrically insulated from each other by the grooves are formed in the first transparent electrode layer, and the narrow portion is formed between one of the grooves defining one of the second electrode elements and another one of the grooves defining another one of the second electrode elements.

20. The method of producing a light control sheet according to claim 15, wherein the electrode element has light transmittance that is changed according to an application state of a voltage signal.

\* \* \* \* \*